(12) United States Patent
Kumar et al.

(10) Patent No.: US 11,048,702 B1
(45) Date of Patent: Jun. 29, 2021

(54) QUERY ANSWERING

(71) Applicant: Amazon Technologies, Inc., Seattle, WA (US)

(72) Inventors: Anjishnu Kumar, Cambridge (GB); Mariia Naslidnyk, Cambridge (GB); Daniel Cristian Duma, Cambridge (GB); Janez Starc, Cambridge (GB); Benjamin Djidi, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 567 days.

(21) Appl. No.: 15/890,794

(22) Filed: Feb. 7, 2018

(51) Int. Cl.
*G06F 16/2453* (2019.01)
*G06F 16/332* (2019.01)
*G06N 3/08* (2006.01)
*G06N 3/04* (2006.01)

(52) U.S. Cl.
CPC .... *G06F 16/24542* (2019.01); *G06F 16/3329* (2019.01); *G06N 3/0427* (2013.01); *G06N 3/08* (2013.01)

(58) Field of Classification Search
CPC .......... G06F 16/24542; G06F 16/3329; G06N 3/0427; G06N 3/08
See application file for complete search history.

(56) References Cited

U.S. PATENT DOCUMENTS

| | | | | |
|---|---|---|---|---|
| 8,892,597 B1* | 11/2014 | Strohman | ........... | G06F 16/3349 707/769 |
| 9,449,002 B2* | 9/2016 | Andavarapu | ........... | G06F 16/43 |
| 10,108,707 B1* | 10/2018 | Chu | ........... | G10L 15/26 |
| 2004/0030741 A1* | 2/2004 | Wolton | ........... | G06F 16/954 709/202 |
| 2005/0182783 A1* | 8/2005 | Vadai | ........... | G06F 16/337 |
| 2006/0026147 A1* | 2/2006 | Cone | ........... | G06F 16/9535 |
| 2008/0168058 A1* | 7/2008 | Gordon | ........... | G06F 16/283 |
| 2009/0006365 A1* | 1/2009 | Liu | ........... | G06F 16/3322 |
| 2009/0287691 A1* | 11/2009 | Sundaresan | ........... | G06F 16/951 |
| 2012/0166438 A1* | 6/2012 | Wu | ........... | G06F 16/3322 707/737 |
| 2012/0221900 A1* | 8/2012 | Yagi | ........... | H04L 67/34 714/48 |
| 2013/0080150 A1* | 3/2013 | Levit | ........... | G10L 15/01 704/9 |
| 2014/0081954 A1* | 3/2014 | Elizarov | ........... | H04N 21/266 707/722 |
| 2014/0214884 A1* | 7/2014 | Anand | ........... | G06Q 10/00 707/769 |

(Continued)

*Primary Examiner* — Mark D Featherstone
*Assistant Examiner* — Navneet Gmahl
(74) *Attorney, Agent, or Firm* — EIP US LLP

(57) ABSTRACT

A method is provided. The method includes determining a number of queries for which an answer was undetermined from a knowledge database and are related to a subject. The method includes determining a period of time associated with receipt of the queries by the knowledge database. The method includes generating, based on the number of queries and the period of time, rate data indicative of a failure rate. The method includes determining that the failure rate satisfies a failure rate condition. The method includes sending text data representative of a query of the queries to a query-answering component different from the knowledge database. Other methods and systems are also provided.

20 Claims, 10 Drawing Sheets

(56) References Cited

U.S. PATENT DOCUMENTS

| | | | | |
|---|---|---|---|---|
| 2014/0222783 A1* | 8/2014 | Chang | ................ | G06K 9/00671 707/722 |
| 2014/0270145 A1* | 9/2014 | Erhart | ................ | H04M 3/5166 379/265.13 |
| 2015/0286684 A1* | 10/2015 | Heinz | ................ | G06F 16/9024 707/769 |
| 2015/0356181 A1* | 12/2015 | Dettman | ............ | G06F 16/9535 707/728 |
| 2015/0363509 A1* | 12/2015 | Maghoul | ................ | G06F 16/33 707/722 |
| 2016/0132501 A1* | 5/2016 | Mengle | ................ | G06F 16/288 707/771 |
| 2016/0132600 A1* | 5/2016 | Woodhead | .......... | G06F 16/7837 707/754 |
| 2016/0156972 A1* | 6/2016 | Oztaskent | .......... | G06Q 30/0246 725/14 |
| 2017/0075946 A1* | 3/2017 | Bossa | ................ | G06F 16/2471 |
| 2017/0124479 A1* | 5/2017 | Baughman | ............ | G06N 20/00 |
| 2017/0132286 A1* | 5/2017 | Baranczyk | ........ | G06F 16/24545 |
| 2017/0329753 A1* | 11/2017 | Beller | .................... | G06F 40/30 |
| 2018/0075335 A1* | 3/2018 | Braz | .................. | G06F 16/3329 |
| 2018/0081970 A1* | 3/2018 | Shimamura | ............ | G06F 16/951 |
| 2018/0107712 A1* | 4/2018 | Aldrich | ............... | G06F 16/2455 |
| 2018/0225365 A1* | 8/2018 | Altaf | .................. | G06F 16/3344 |
| 2018/0336247 A1* | 11/2018 | Ignatyev | ........... | G06F 16/24542 |
| 2018/0349377 A1* | 12/2018 | Verma | .................. | G06N 3/0454 |
| 2019/0369957 A1* | 12/2019 | Spector | ................ | G10L 15/265 |
| 2019/0371314 A1* | 12/2019 | Naughton | ............... | G06F 3/167 |
| 2019/0378024 A1* | 12/2019 | Singh | .................. | G06F 16/90332 |
| 2020/0050694 A1* | 2/2020 | Avalani | ................ | G06F 16/285 |
| 2020/0057762 A1* | 2/2020 | Okajima | ................ | G06F 40/40 |
| 2020/0342850 A1* | 10/2020 | Vishnoi | .................. | G06N 20/00 |

\* cited by examiner

QUERY ANSWERING

BACKGROUND

Computer-based query-answering systems, such as knowledge databases, can provide highly accurate answers to queries submitted by users. However, the effectiveness of such systems for answering queries relating to current events may be improved, for example to improve the processing efficiency of such systems.

SUMMARY

According to some examples, a method is provided. The method includes determining, from query data representative of a subject of first queries received by a knowledge database, that the knowledge database is lacking information to provide in response to the subject. The method includes using time data representative of a respective time of receipt of the first queries by the knowledge database to train a neural network to model a rate of receipt of the first queries by the knowledge database, to generate a trained neural network. The method includes inputting a period of time to the trained neural network to generate an output of the trained neural network representative of a predicted rate of receipt of second queries by the knowledge database over the period of time, the second queries related to the subject. The method includes determining a measured rate of receipt of the second queries by the knowledge database over the period of time. The method includes determining that the measured rate exceeds the predicted rate by a rate difference amount which exceeds a rate difference threshold. The method includes sending text data representative of a query of the second queries to a query-answering component different from the knowledge database.

According to some other examples, a method is provided. The method includes determining a number of queries for which an answer was undetermined from a knowledge database and are related to a subject. The method includes determining a period of time associated with receipt of the queries by the knowledge database. The method includes generating, based on the number of queries and the period of time, rate data indicative of a failure rate. The method includes determining that the failure rate satisfies a failure rate condition. The method includes sending text data representative of a query of the queries to a query-answering component different from the knowledge database.

According to yet other examples, a system is provided. The system includes at least one processor. The system includes at least one memory comprising computer program instructions. The at least one memory and the computer program instructions are operable to, with the at least one processor, determine a number of queries for which an answer was undetermined from a knowledge database and are related to a subject. The at least one memory and the computer program instructions are operable to, with the at least one processor, determine a period of time associated with receipt of the queries by the knowledge database. The at least one memory and the computer program instructions are operable to, with the at least one processor, generate, based on the number of queries and the period of time, rate data indicative of a failure rate. The at least one memory and the computer program instructions are operable to, with the at least one processor, determine that the failure rate satisfies a failure rate condition. The at least one memory and the computer program instructions are operable to, with the at least one processor, send text data representative of a query of the queries to a query-answering component different from the knowledge database.

DETAILED DESCRIPTION

Natural language processing (NLP) is a field of computer science, artificial intelligence, and linguistics concerned with the interactions between computers and human languages, sometimes referred to as natural languages. Natural language processing includes natural language understanding (NLU), which deals with machine reading comprehension, enabling computers to derive meaning from text data representative of natural language.

Knowledge databases may be used to answer queries expressed in the form of text, via text input or converted to text from speech or other audio data for example. Typical knowledge databases include a large quantity of information relating to historical facts or facts that are unchanging or change infrequently. Such knowledge databases may therefore be highly precise for returning the answer to queries relating to facts such as these.

Examples described herein may be used to improve the retrieval of answers to queries relating to subjects that are rapidly changing, such as new or currently unfolding events. The methods and systems described herein may therefore have a higher success rate for returning a correct answer to such queries. These methods and systems may therefore improve the quality of the user experience for users seeking an answer to such queries.

In particular, the examples described herein may have improved effectiveness for answering queries that become popular for a short amount of time before subsequently reducing in popularity. Such queries may be referred to as bursty or emerging trends, and may relate to an event that is happening in the wider world. For example, queries like this may relate to weather patterns, sporting events, political developments or other one-off events or events with a relatively short duration.

Figure 1:
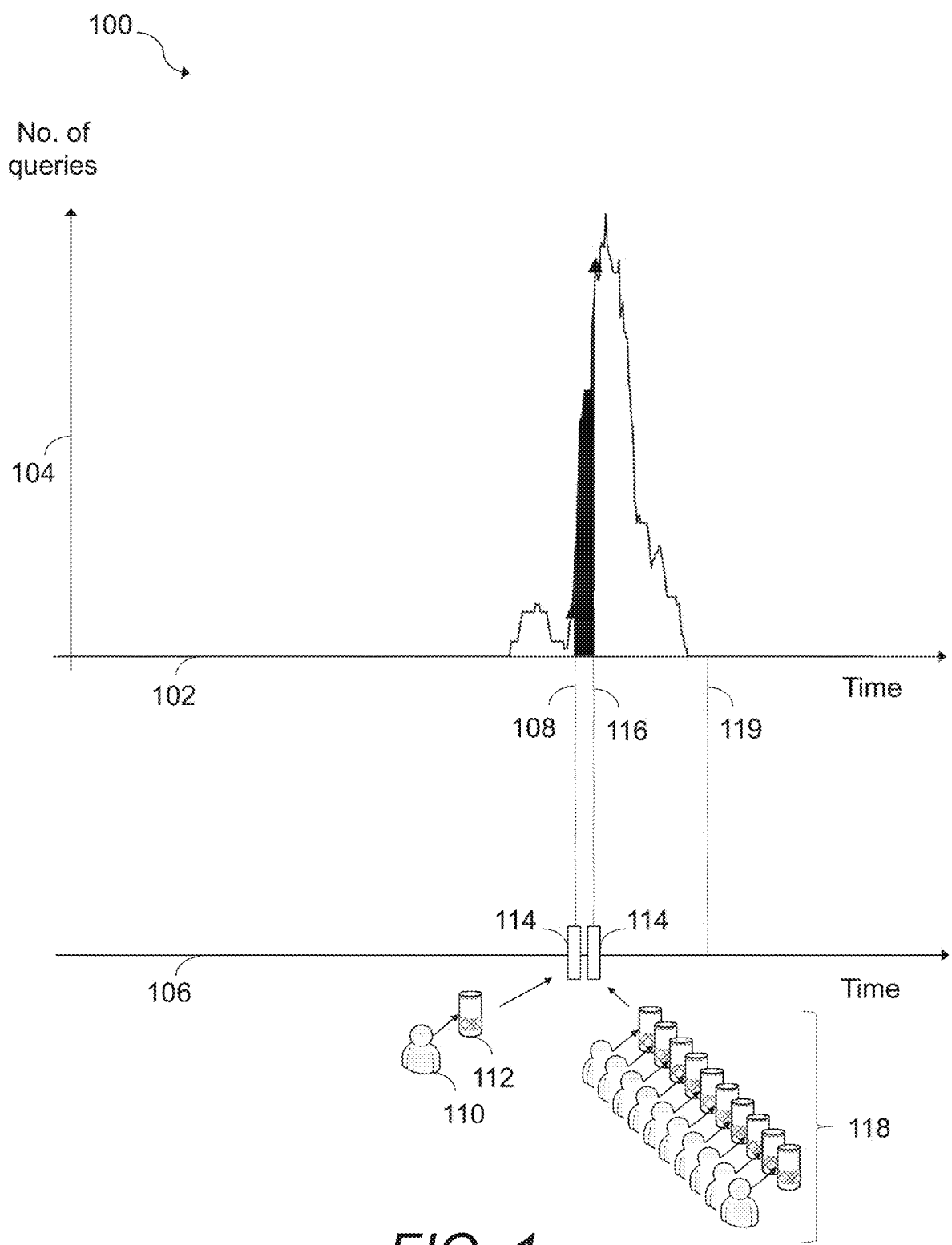
FIG. 1 is a graph illustrating an example of receipt of queries relating to a particular subject.

FIG. 1 is a graph 100 illustrating an example of receipt of queries relating to a particular subject. The graph 100 of FIG. 1 shows an example frequency or rate of the receipt of a query related to a particular subject by a knowledge database. The x-axis 102 of the graph 100 shows the time elapsed and the y-axis 104 of the graph shows the number of instances of this query that the knowledge database was unable to answer (which in this case is equivalent to the number of instances of this query received by the knowledge database, as the knowledge database was unable to answer this query).

As can be seen from FIG. 1, in examples such as this, the rate of receiving queries related to a particular topic, subject or question may increase rapidly over a relatively short time period before dying down equally rapidly. In this case, the majority of receipts of the query occurred within around 5 days, although other queries may peak and die down over a shorter or a longer time period.

The emergence of a trend of this query occurs within the black section of the graph of FIG. 1, but it can be seen that the trend reduces shortly after this. This is shown schematically on a separate timeline 106, with the same scale as the x-axis 102. At a first time 108 a user 110 asks a query to a speech controlled appliance 112. The speech controlled appliance 112 sends the query to a speech processing system 114 (described further below with reference to FIGS. 2 and 3). The speech processing system 114 processes the query and sends it to a knowledge database, in an attempt to retrieve an answer to the query from the knowledge database. However, in this instance, the knowledge database does not include an answer to the query. The query associated with the first time 108 is therefore a failed query. At a second time 116, subsequent to the first time 108, ten users submit respective queries to respective speech controlled appliances (labelled collectively with the reference numeral 118). These queries are also sent to the speech processing system 114. The queries at the second time 116 relate to the same subject as the queries at the first time 108. The knowledge database thus is also unable to provide a satisfactory answer to the queries at the second time 116, which are therefore also failed queries. It can be seen that there is a large increase in the number of failed queries between the first time 108 and the second time 116. It is noted that the absolute numbers of failed queries shown in FIG. 1 is merely illustrative. In practice, the absolute number of failed queries at a given time may be higher than the numbers shown in FIG. 1.

A knowledge database may include an error detection system to detect instances in which the knowledge database is unable to return an answer. However, the error detection system may be used relatively infrequently, such as once a day, to avoid overloading the knowledge database with updates. Thus, in such cases, errors relating to a trending subject may not be detected until the trend has already died down. Hence, even if the knowledge database is updated to include an answer to a query that is trending, the impact of such an update on users of the knowledge database may be minimal as, by that point, relatively few users may be asking that query. For example, if the knowledge database is updated at a third time 119, at which no users are asking queries related to the trending subject, the users of the system may not benefit from the update to the knowledge database unless the same subject begins trending again in the future.

Methods described herein for example allow a response to trending queries to be improved, such as trending queries for which a knowledge database is lacking information to provide in response. In examples, methods herein involve determining a number of queries for which an answer was undetermined from a knowledge database. Such queries are for example queries for which an answer could not be determined, or an answer was undeterminable from a knowledge database, or for which a knowledge database is lacking in information to provide in response, and may be referred to herein as failed queries, for which there has been a failure to determine an answer to one or more queries. A period of time is associated with receipt of the queries by the knowledge database. For example, the period of time may correspond to a time interval within which the queries were received by the knowledge database or a time interval within which failure indications indicating that the knowledge database was unable to answer the queries were received. Rate data indicative of a failure rate is generated based on the number of queries and the period of time. Each of the failed queries is related to the same subject. For example, each of the queries may correspond to the same or a similar question but some or all of the queries may be asked in different ways, with different phrasing. For example, the queries "Where is X right now?" and "What is the location of X at the moment?" may be considered to relate to the same subject, as each of these queries corresponds to the same question but using different wording. In general, there are a number of different ways a given question can be asked. The methods herein may be considered to normalize the various different natural language ways in which a question can be expressed and then use the number of normalized instances to determine whether a particular query (such as a failed query) is trending.

Such methods involve determining, based on the rate data, that the failure rate satisfies a rate condition. For example, satisfying the rate condition may be considered to correspond to identifying that the failed queries are trending or relate to a question that is increasing in popularity sufficiently rapidly that the failure to answer these queries has a sufficiently adverse impact on users of the knowledge database. If it is determined that the subject the failed queries relate to is a trending subject, text data representative of a query of the queries is sent to the query-answering component rather than the knowledge database. The query-answering component may for example be able to provide an answer to the query that the knowledge database is unable to provide. A response to the query may therefore be provided more effectively by the query-answering component than by the knowledge database. Moreover, the emergence of a trend may be identified while the trend is still occurring, allowing further queries relating to the trend to be answered more effectively or efficiently than otherwise. For example, queries received subsequently that relate to the trending subject may also be sent to the query-answering component or they may be sent to the knowledge database, which may have been updated to include an answer to queries relating to the trending subject.

Figure 2:
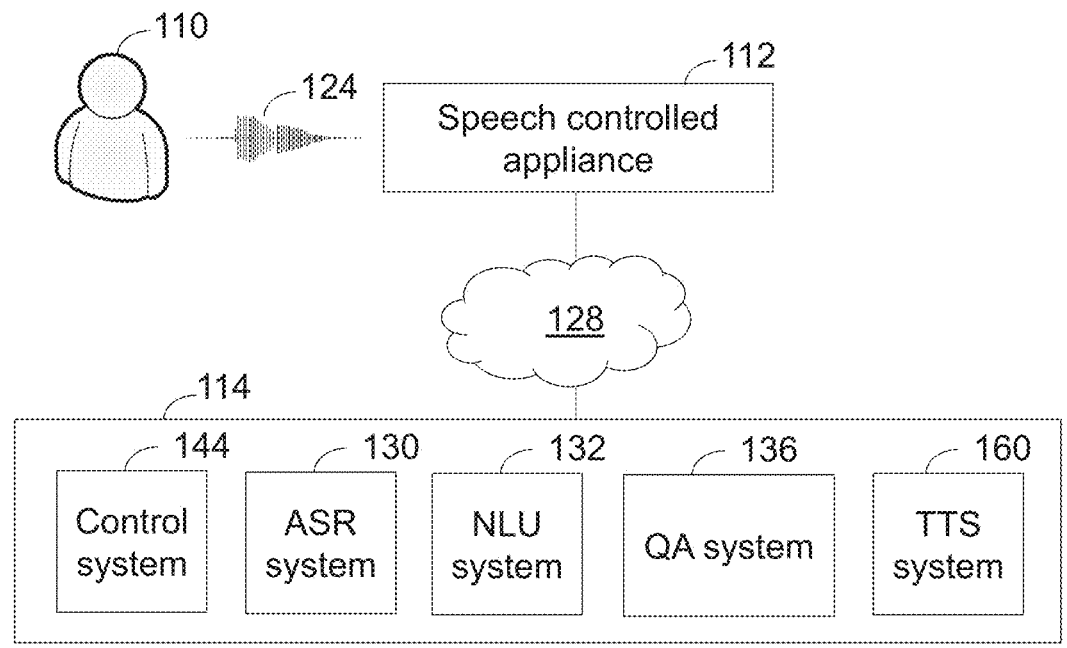
FIG. 2 is a schematic diagram showing an example system for processing queries.

FIG. 2 shows schematically an example system for processing queries. The system of FIG. 2 includes a speech processing system 114, although it is to be appreciated that the methods described herein may be performed using systems arrange to receive inputs in other formats than speech, such as systems arranged to receive text input rather than voice or spoken input. The system of FIG. 2 for example allows queries relating to trending subjects to be identified and answered appropriately. As will be appreciated, the system of FIG. 2 is merely illustrative; the methods described herein may be performed using a number of different devices and computer systems, including, for example, general-purpose computing systems, server-client computing systems, mainframe computing systems, telephone computing systems, laptop computers, cellular phones, personal digital assistants (PDAs), tablet computers or other mobile devices.

For example, the methods described herein may be performed using a system including at least one processor and at least one memory comprising computer program instructions. The at least one processor and the at least one memory may be located in the same computer device, or the at least one processor and the at least one memory may be located in different devices, such as in a distributed computer system, such as a cloud computer system.

The at least one processor may be a central processing unit (CPU) for processing data and computer-readable instructions. In other examples, the at least one processor may be a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computer devices, e.g., a combination of a DSP and a microprocessor, a plurality of microprocessors, one or more microprocessors in conjunction with a DSP core, or any other such configuration. The at least one processor may be coupled, using one or more buses, to read information from or write information to one or more memories, such as the at least one memory. The at least one processor may additionally, or in the alternative, contain memory, such as processor registers.

The at least one memory may include volatile random access memory (RAM), non-volatile read only memory (ROM), and/or other types of memory. In other examples, the at least one memory may be a data storage component of a computer device, for storing data and instructions. The data storage component may include one or more storage types such as magnetic storage, optical storage or solid-state storage. Computer instructions for processing by the at least one processor for operating the computer device and its various components in accordance with the methods described herein may be executed by the at least one processor and stored in the at least one memory. Some or all of the executable instructions may be embedded in hardware or firmware in addition to or instead of software. The methods described herein may be implemented in various combinations of software, firmware, and/or hardware, for example.

In FIG. 2, a speech-controlled appliance 112 is arranged to capture a spoken utterance 124 of a user 110 via an audio capture device such as a microphone or a microphone array. The audio capture device may be integrated into or may be separate from the speech controlled appliance 112. The speech controlled appliance 112 may also include at least one speaker, for example for providing audio output for responding to a user in response to the user's utterance 124, for example based on NLU of the user's utterance 124, to provide an appropriate response to the user's utterance, such as an answer to a question asked by the user. The speech controlled appliance 112 may be part of a computer device, such as a device with computational capability such as a laptop or personal computer; a mobile or a cellular phone.

The speech-controlled appliance 112 transmits the utterance 124 over a network 128 for receipt by other components of the system of FIG. 2. The utterance 124 may be processed by the speech controlled appliance 112, or other components accessible to the speech controlled appliance 112, for example to reduce noise or improve a quality of the captured utterance before the utterance 124 is transmitted. The network 128 may be any suitable data network, for example a computer network such as the Internet, a local area network, a wide area network, a telecommunications network, a wired network, a wireless network, or some other type of network, or may include a series of networks such as these.

In the example of FIG. 2, the utterance 124 is transferred from the speech-controlled appliance 112 to a control system 144 of the speech processing system 114. The control system 144 then sends the utterance 124 to an automatic speech recognition (ASR) system 130 of the speech processing system 114 for converting the utterance 124, which may be in the form of audio data to text data. The audio data may be in the form of a digitized representation of an audio waveform of the utterance 124.

Audio data may be processed in real time or may be saved and processed at a later time. Audio data may be input to the ASR system 130 which then interprets the utterance 124 represented by the audio data based on the similarity between the utterance 124 and models known to or accessible to the ASR system 130. For example, the ASR system 130 may compare the input audio data with models for sounds (e.g., subword units or phonemes) and sequences of sounds to identify words that match the sequence of sounds spoken in the utterance 124. The different ways an utterance may be interpreted may each be assigned a probability or a recognition score representing the likelihood that a particular set of words matches those spoken in the utterance 124. The recognition score may be based on a number of factors including, for example, the similarity of the sound in the utterance 124 to models for language sounds (e.g., an acoustic model), and the likelihood that a particular word which matches the sounds would be included in the sentence at the specific location (e.g., using a language or grammar model). Based on the considered factors and the assigned recognition score, the ASR system 130 may output the most likely words recognized in the audio data The ASR system 130 may also output multiple alternative recognized words in the form of a lattice or an N-best list.

The ASR system 130 of FIG. 2 includes an echo cancellation filter, an acoustic front end (AFE), a speech recognition engine, and speech storage. The echo cancellation filter for example compares audio that is output by the user 110 of the speech controlled appliance 112 with sound picked up by the audio capture device of the speech controlled appliance 112, and removes the output sound from the captured sound in real time. Echo cancellation is commonly used by cellular telephones and other telephones operating as speaker phones, and facilitates the ASR process by removing a component of captured sounds that can interfere with speech recognition.

The AFE transforms the audio data after echo cancellation into data for processing by the speech recognition engine. The speech recognition engine compares the speech recognition data with the acoustic, language, and other data models and information stored in the speech storage for recognizing the speech contained in the original audio data. The AFE and speech recognition engine may include their own controller(s)/processor(s) and memory or they may use at least one processor and the at least one memory of the speech processing system 114 (which may be accessible to other components of the speech processing system 114), for example. Similarly, the instructions for operating the AFE and speech recognition engine may be located within the ASR system 130, within at least one memory and/or storage of the speech processing system 114, or within an external device.

The AFE within the ASR system 130 may divide the digitized audio data into frames, with each frame representing a time interval, for example 10 milliseconds (ms). During that frame the AFE determines a set of values, a feature vector, representing the features/qualities of the utterance portion within the frame. Feature vectors may contain a varying number of values and represent different qualities of the audio data within the frame. Audio qualities of points within a frame may be stored into feature vectors. Feature vectors may be streamed or combined into a matrix that represents a time period of the spoken utterance 124.

These feature vector matrices may then be passed to the speech recognition engine for processing. A number of approaches may be used by the ASR system 130 and AFE to process the audio data. Such approaches may include using mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine attempts to match received feature vectors to language phonemes and words such as may be known in storage or at least one memory accessible to the ASR system 130. The speech recognition engine may compute recognition scores for the feature vectors based on acoustic information and language information. The acoustic information may be used to calculate an acoustic score representing a likelihood that the intended sound represented by a group of feature vectors match a language phoneme. The language information may be used to adjust the acoustic score by considering what sounds and/or words are used in context with each other, thereby improving the likelihood that the ASR system 130 outputs speech results that make sense grammatically.

The output of the ASR system 130 in FIG. 2 is in the form of text data, representative of text. Text data may be in any suitable format for representing text. For example, text data may be in the form of one or more strings, where a string is typically a sequence or series of characters. A string is generally considered to be a data type, which may be implemented using an array data structure, with elements of the array storing characters of the sequence of characters corresponding to the string. Alternatively, text data may be represented as a vector, such as a feature vector, or an array of vectors. For example, each feature vector may be considered to correspond to a separate word of the utterance 124, such that the utterance 124 may be represented as an array of feature vectors. Alternatively, the utterance 124 may be represented using solely one vector, which may be formed by concatenating feature vectors representative of individual words of the query. It is to be appreciated that the format of text data may be modified as the text data is transferred between different components of a system such as that of FIG. 2 and may differ depending on the components of the system. For example, where the methods described herein are employed in a system in which input text corresponding to a query is submitted by a user, the text data representative of the query may be in the form of a string. If, however, the methods described herein are employed within a speech processing system such as that of FIG. 2, the text data may be in the form of a vector. In other examples, the ASR system 130 may output multiple alternative recognized words in the form of a lattice or an N-best list, in addition to or instead of text data.

Following ASR processing, the text data generated by the ASR system 130 of FIG. 2 is sent by the ASR system 130, for example via the control system 144, to a natural language understanding (NLU) system 132 of the speech processing system 120 for further speech processing. The NLU system 132 may also receive textual input from another source, such as via an I/O component of the speech processing system 114. The NLU system 132 may include a dedicated NLU engine, processor, memory, storage, named entity recognition (NER) system and/or other components, and/or may use components otherwise available on or accessible to the speech processing system 114. The NLU system 132 takes the text data output from the ASR system 130 and attempts to make a semantic interpretation of the text data. That is, the NLU system 132 may determine the meaning behind the text, for example based on the individual words, and then may execute a command based on the meaning or pass a command to a downstream application for execution. The NLU processing is based on the models and programming available to the NLU system 132. Such models may be grammar based, rule based, or constructed in a different manner.

NER processing involves processing a sequence of words in a textual input, recognizing and identifying specific important words, called named entities, of an NLU textual input and assigning a tag or label to those words, which may be performed by a NER system of the NLU system 132. The tag or label is a classification of the associated word that may assist eventually implementing the user's utterance 124. Certain parts of speech (such as conjunctions that join phrases, clauses and sentences) may be considered less important, thus not considered a named entity and may not receive a tag.

As part of determining what (if any) tag to apply to each word, the NER system may consider textual context information, such as what words come before or after the word being processed or what other words appear in the sentence. These factors to consider in processing, called features, are indicated to the NER system through feature vectors. Each word in the sequence of words maps to a feature vector. The feature vector is a long data structure which indicates what circumstances apply to the particular word. For example, a NLU system 132 may have access to an index of thousands of words that are known to the system. The feature vector may include an entry for all or a subset of the words in the index to indicate whether the selected word of the index is the actual word being processed, whether a word in the index is located in the same sentence as the word being processed, or whether a word in the index is directly before or after the word being processed. The information in the feature vector may then influence the NER processing in its attempt to tag the text.

A feature vector may include components that are binary features that may be effectively "yes or no" indicators or may include non-binary values. Other information about the text may also be indicated to the NER system through entries in the feature vector. The individual feature vectors for specific words are typically sparse, meaning that only a small subset of the feature vector entries have a non-zero value. The information represented by the feature vector entries are typically defined when training the models used by the NER system. When performing NER, the NER system thus may process the feature vector associated with the word, rather than processing the word itself.

Generally, models used for NER may be trained with feature vectors such as those associated with words during NER processing, with the feature vectors capturing the word identity as well as other information that may be pertinent to that word (e.g. contextual and other information as mentioned above). Known models that may be used in NER include maximum entropy models (also known as log-linear models), such as Maximum Entropy Markov Models (MEMMs) or Conditional Random Fields (CRFs). The underlying model may apply weights to certain of the data/feature-components associated with the word and included in the feature vector. The weights may determine the relative importance of each of the feature vector components. Feature vector weights may be applied during training where the underlying NLU model essentially provides the set of weights that are trained on a certain set of data/words and those weights indicate how important each of those feature vector components are. Thus the NER model internally has weight vectors that have the same dimension as the actual feature vectors and when the NER system is predicting the labels, it may calculate an inner product (or dot product) of the feature vector and the weight vector so that each individual feature of the feature vector is properly weighted.

The further processing of the text data performed by the NLU system 132 therefore attempts to make a semantic understanding of the text data, for example to identify an intent of the text data. In this way, the NLU system 132 may be used to identify that the text data represents a query.

Text data representing a query may then be transferred to a query-answering system 136 in an attempt to obtain answer text data representative of an answer to the query represented by the utterance 124. In examples, the query is transferred to a knowledge database of the query-answering system 136. If the knowledge database is unable to provide a satisfactory answer to the query, the text data may be sent to a query-answering component of the query-answering system 136. The query-answering component may provide a satisfactory answer to the query or may generate instructions to update the knowledge database to contain a satisfactory answer. As described further below, the query-answering system 136 may include a trend detection system for detecting whether a subject of queries is trending and may send failed queries to the query-answering component where it is determined that the subject of the failed queries is a trending subject. If the subject is not trending, the query-answering system 136 may not send the failed queries to the query-answering component and may instead transfer an indication to the user that no satisfactory answer can be obtained.

Answer text data representative of an answer to the query obtained by the query-answering system 136 may be converted to output audio data for output to the user 126, for example using a text to speech system 160 of the speech processing system 114. The text to speech system 160 of FIG. 2 may include a speech synthesis system for converting the answer text data to the output audio data, which may be a separate system or component or integrated with other systems or components of the system of FIG. 2. An example of a query-answering system for use with systems such as that of FIG. 2 is described further below with reference to FIG. 11.

In this and other examples, the speech processing system 114 may be a network-distributed service, which may be referred to as a "cloud" service. In other words, for example, the speech processing system 114 are accessible to the speech controlled appliance 112 via the network 128 but are not stored directly on or as part of the speech controlled appliance 112. The speech processing system 114 is instead stored in at least one remote device, such as a computer device that is remote from the speech controlled appliance 112. In other examples, though, the speech controlled appliance 112 may comprise some or all of the speech processing system 114.

Figure 3:
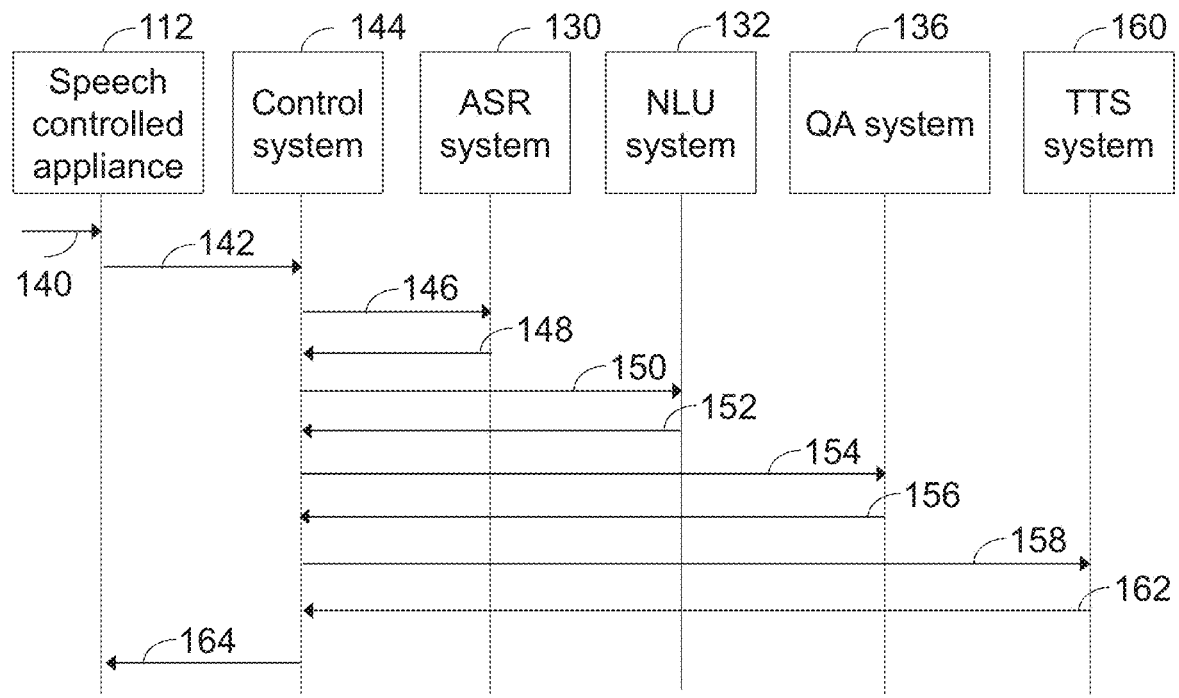
FIG. 3 is a sequence diagram showing an example of communications between components of the example system of FIG. 2.

FIG. 3 is a sequence diagram showing an example of communications between components of the example system of FIG. 2. The speech controlled appliance 112 receives 140 what may be referred to as a wake word and an utterance 124. A wake word is for example a command that may be used to activate the speech controlled appliance 112 from a standby mode. Recognition of the wake word may be performed by comparing words received by the speech controlled appliance 112 to a list of command words or by using limited NLU processing to determine that an intent of the user 110 is to activate the speech controlled appliance 112. In other examples, though, the user 110 may activate the speech controlled appliance 112 from the standby mode via other input than a wake word, for example by pressing a button of the speech controlled appliance 112.

The utterance 124 represents a user input to the speech controlled appliance 112 and in this example represents a query. A query may be considered to be any sentence or series of words or text to elicit a response from the speech controlled appliance 112. The query for example represents a question that the user is seeking an answer to. For example, typical queries may be expressed in a form that ends with a question mark (although they may alternatively be worded as commands). For example, the command "Tell me the time" may be reworded as "What is the time?" and may therefore be considered to correspond to a query.

The utterance 124 is sent 142 to the control system 144, which may be referred to as an orchestrator, as it orchestrates or coordinates the sending of data and/or commands to other components, such as other components of the speech processing system 114. The control system 144 sends 146 audio data representing the utterance 124 to the ASR system 130. The ASR system 130 converts the audio data to text data as described above with reference to FIG. 2. The ASR system 130 may also detect an endpoint of the utterance 124 and send a message to the speech controlled appliance 112 to close an audio data stream. This message may be sent via the control system 144.

The ASR system 130 sends 148 the text data to the control system 144. The control system 144 then sends 150 the text data to the NLU system 132 to classify the intent of the text represented by the text data.

After processing of the text data by the NLU system 132, text data output by the NLU system 132 is sent 152 to the control system 144. The control system 144 may then send one or more directives to perform various actions on the speech controlled device 112, such as to play audio data, open a microphone of the speech controlled appliance 112, pause media that is currently being played by the speech controlled appliance 112, adjust a volume of audio output by the speech controlled appliance 112 or other actions, depending on the intent identified by the NLU system 132. The control system 144 may also send further instructions based on the text data. In the example of FIG. 3, the NLU system 132 identifies that the text data represents a query and the control system 144 sends 154 the text data to the query-answering system 136. In this example, the text data is representative of a query corresponding to the utterance 124. The text data is sent 154 to the query-answering system 136 along with a command to retrieve an answer to the query represented by the text data, using the query-answering system 136. Further details of obtaining an answer to a query from a query-answering system such as that of FIG. 3 are provided below, with reference to FIGS. 4 to 11.

If the query-answering system 136 includes an answer to the query, the query-answering system 136 returns 156 answer text data representing the answer to the control system 144. The control system 144 then sends 158 an instruction to a text to speech (TTS) system 160 to convert the answer text data to output audio data representing the answer. The TTS system returns 162 the output audio data to the control system 144, which then sends 164 the output audio data to the speech controlled appliance 112. The speech controlled appliance 112 can then play output audio based on the output audio data to the user 110.

Figure 4:
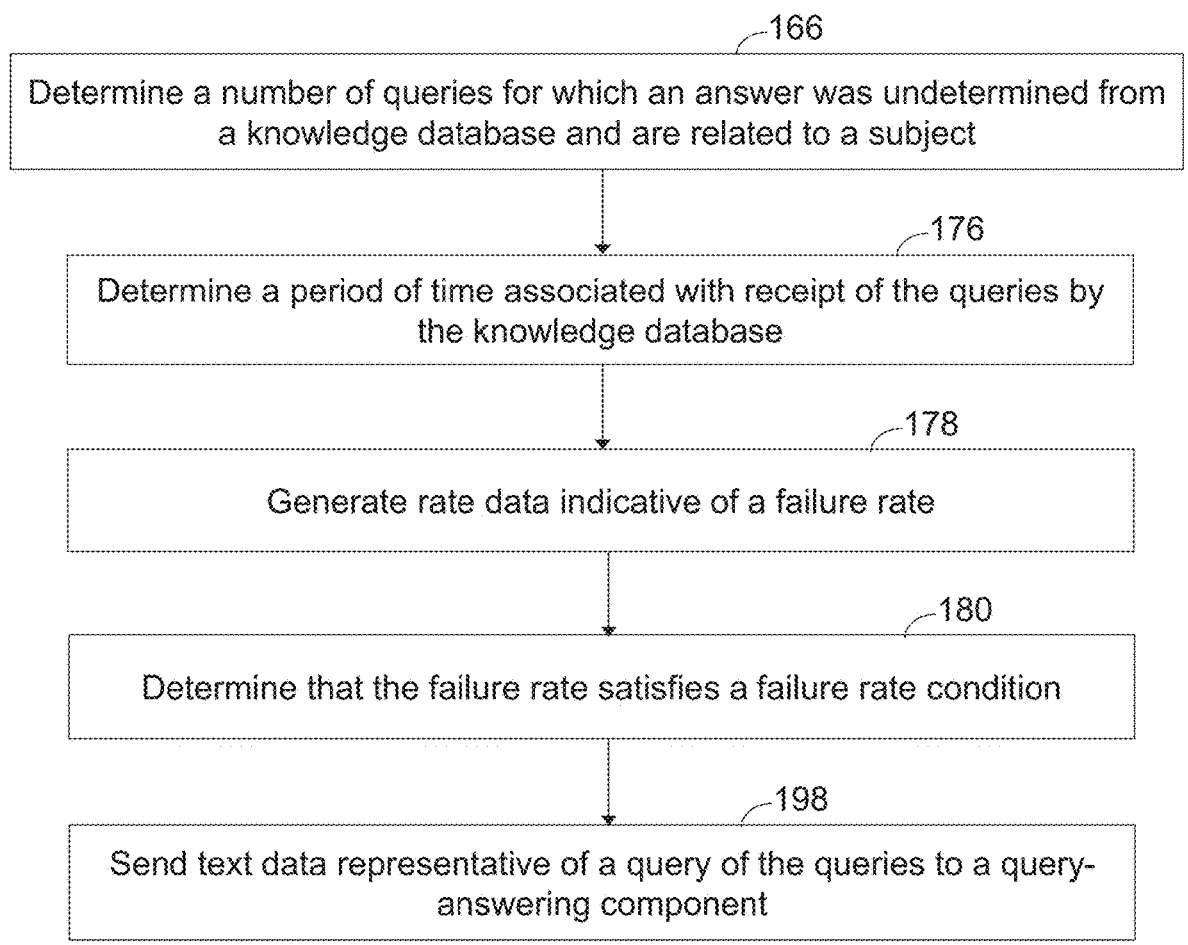
FIG. 4 is a flow diagram showing an example method involving a query-answering system.

As noted above, however, in some examples, a knowledge database of the query-answering system 136 may not include an answer to a particular query, such as a query relating to a topic or subject that shows a sudden surge or increase in popularity, such as a query relating to a current event. FIG. 4 is a flow diagram showing a method according to examples, which may be used in situations involving queries such as this. The method of FIG. 4 may for example be implemented by a trend detection system, such as the trend detection system described with reference to FIG. 11. A trend detection system such as this may for example form part of a query-answering system such as the query-answering system 136 of FIGS. 2 and 3.

At item 166 of FIG. 4, a number of queries for which an answer was undetermined from a knowledge database is determined. An answer may in examples be considered to be undetermined where the knowledge database fails to return a satisfactory answer. A satisfactory answer is for example an answer that fulfils the expectations or needs of a user. Answers that are satisfactory may be acceptable or tolerable without being outstanding or perfect. For example, a satisfactory answer may provide sufficient information to answer a query, without providing a large amount of detail. However, satisfactory answers in some cases may be of a high standard or may exceed a user's needs. A satisfactory answer is typically factually correct and may be provided in a timely manner.

The number of queries are related to the same subject. For example, as explained above, the queries may be asked using different natural language but may nevertheless correspond to the same question.

The queries may be represented by text data. For example, there may be a text data element, such as a separate piece or component of text data, associated with individual queries. The text data may not represent the entirety of a query. For example, certain common words, which may be referred to as stop words, may be removed during the generation of the text data. Various techniques may be used to remove stop words, such as term frequency-inverse document frequency (TF-IDF) techniques. TF-IDF typically represents a value that aims to represents the importance of a term (which is for example a word) to a document in a collection of documents. In this context, TF-IDF techniques may be used to derive a value that represents the importance of words of the text data to the text data. Data representative of words that are determined to be less important, such as beneath a predetermined threshold, may be removed from the text data.

A knowledge database typically includes numerous facts, usually in the form of fact triples (sometimes referred to simply as a "triple"). A fact triple generally corresponds to a particular subject-predicate-object expression, which can be used in computer-based question answering. For example, a knowledge database that includes facts that express the relationship between a subject and a predicate allows a question based on two of the subject-predicate-object fact triple to be answered using the knowledge database. Such fact triples can be expressed in the form of predicate (subject, object), where the predicate is a relationship or relation and the subject and object may be considered to be entities that participate in that relationship. For example, if a user asks a question, either via a text input or by a voice input, such as "Who wrote the novel Postcards from the Edge?" and the knowledge database includes the fact triple author of (Postcards from the Edge, Carrie Fisher) in the form of predicate (subject, object), the question can be answered successfully, and the answer "Carrie Fisher" can be returned in response to the question.

Figure 5:
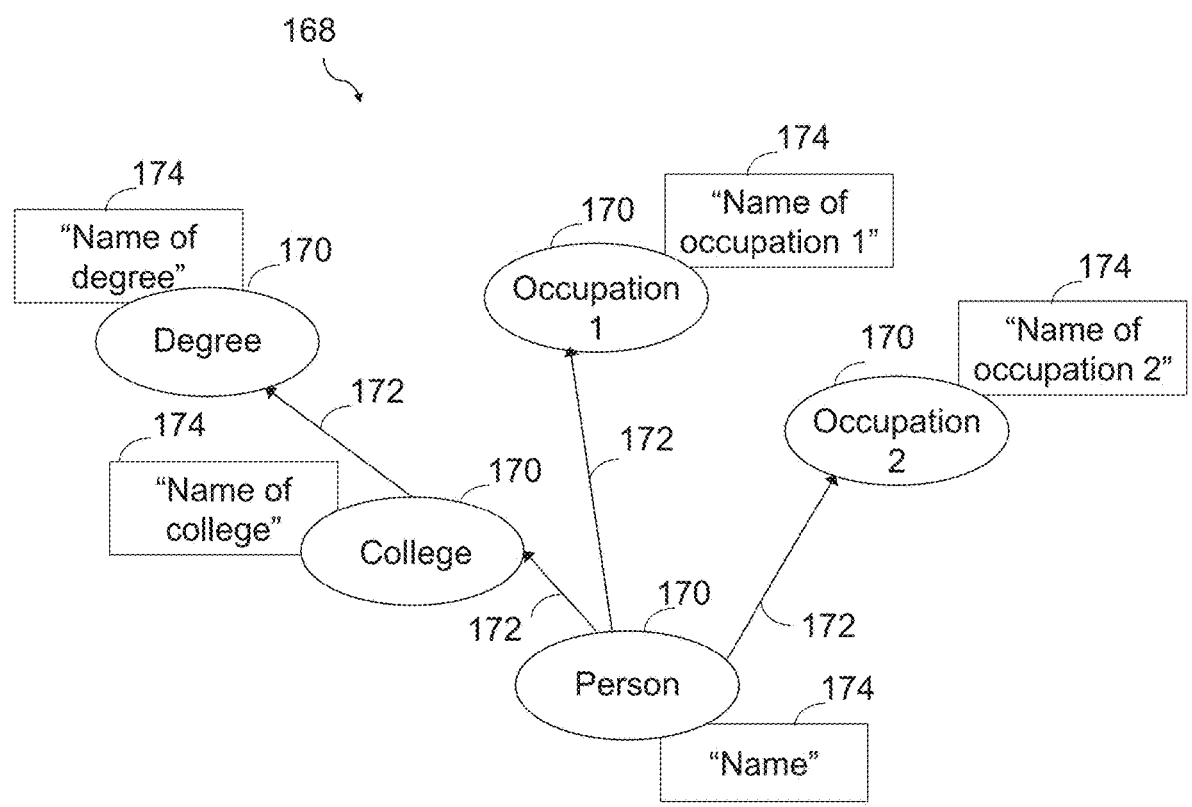
FIG. 5 is an example of part of a knowledge database.

An example of a knowledge database 168 is shown in FIG. 5. A knowledge database may sometimes be referred to as a knowledge base. The knowledge database 168 of FIG. 5 is for example a subset of a larger knowledge database. The knowledge database 168 includes a plurality of entities 170, each of which is within an oval box. The knowledge database 168 includes entity data which is representative of the plurality of entities 170. The knowledge database 168 in this example also includes relationship data representative of relationships 172 between respective pairs of entities of the plurality of entities 170, which are illustrated in FIG. 5 with arrows. A relationship between a pair of entities may for example be a direct relationship, with no intervening entities between the pair of entities. Alternatively, a relationship may be an indirect relationship, with one or more entities between the pair of entities.

A knowledge database such as the knowledge database 168 of FIG. 5 may be structured as a graph, with a plurality of nodes and a plurality of edges. In such cases, an entity 170 may correspond with a node of the graph and a relationship 172 may correspond with one or more edges of the graph. For example, the entity data may be representative of respective nodes of the graph and the relationship data may be representative of respective edges of the graph. For example, a direct relationship between two entities may correspond with one edge between two nodes corresponding to the two entities and an indirect relationship between two entities may correspond with a plurality of edges between the two nodes corresponding to the two entities.

In the example of FIG. 5, an entity may be associated with entity text 174. In FIG. 5, the entity text 174 is shown within a rectangular box and may be represented by entity text data. The entity text typically denotes or represents the entity associated with the entity text. The entity text data may for example be used to search for entities within the knowledge database 168, for example using a string matching technique. Methods such as this may therefore be used to answer queries submitted to the knowledge database 168. For example, if a query includes two components of a fact triple, which may be expressed in the form of predicate (subject, object), the knowledge database 168 can be queried to locate, for example, entities corresponding to the subject and the object, connected by a relationship corresponding to the predicate. The answer to the query can then be returned, for example by returning the missing component of the fact triple.

In other examples, querying a knowledge database such as the knowledge database 168 of FIG. 5 may involve the use of a template representative of the query and identifying portions of the knowledge database that either exactly match the template or that match the template to a certain statistical degree. The template may be obtained from natural language (such as natural language representative of the query) using NLP techniques that would be familiar to the skilled person. In cases in which the knowledge database may be structured as a graph, with a plurality of nodes and a plurality of edges, a template representing a query may also be in the form of a graph. As explained above, a subject or object of a fact triple may correspond with a node of the graph and a predicate of a fact triple may correspond with an edge of the graph. In such cases, a template graph representing the query may include a first node corresponding with a subject, a second node corresponding with an object and an edge connecting the first node to the second node, which represents the predicate. An answer to such a query may be retrieved from the knowledge database by determining a portion of the graph representing the knowledge database (for example including two nodes and an edge connecting the two nodes) that corresponds with or matches the template graph, either exactly or to a certain level of statistical certainty. This is merely an example, though, and in other examples a knowledge database may be structured or queried in a different manner.

In some examples, the query-answering system may include at least one additional element to which the query may be submitted before sending the query to the query-answering component. For example, the query-answering system may include a rule-based element for answering queries. Given input text and text data representative of a query, a rule-based element may be used to parse the text data and the input text and apply a number of rules to the input text, which may be hand-crafted lexical and semantic heuristic rules. Each rule awards a certain number of points to a sentence of the input text. The sentence of the input text with the highest score is returned as the answer to the query represented by the text data. The input text may be or include text of encyclopedia articles, news articles or scientific papers.

In further examples, the query-answering system may include an information retrieval element. An information retrieval element for example uses full-text or context-based indexing of text data from a collection of different sources, such as documents, data structures such as databases, or metadata associated with documents. For example, the information retrieval based element may search the collection of sources for an exact or partial match between text content of the collection of sources and some or all of the text of the text data. As for the rule-based element, the collection of sources may for example include information sources such as encyclopedia articles, news articles or scientific papers.

In examples in which the query-answering system includes at least one additional element, the query-answering system may allocate text data representative of a query to the knowledge database or to one of the other elements for answering. The allocation of the text data may be based on a content of the query represented by the text data. For example, where the text data represents a query that may be represented as a fact triple, the text data may be sent to the knowledge database, as it may be relatively straightforward or efficient to extract an answer to such a query from the knowledge database (providing the knowledge database includes an answer to that particular query). Conversely, in other cases, the text data may first be transferred to a rule-based element or an information-retrieval based element rather than the knowledge database, as in other cases, these elements may be queried more efficiently than a knowledge database.

In cases such as this, if the text data is first sent to the knowledge database, the text data may subsequently be sent to one of the other elements if the knowledge database is unable to provide an answer to the query, and vice versa. This may continue until a satisfactory answer has been obtained or until the text data has been transmitted to the knowledge database and to each of the other elements. The order or sequence according to which the text data is transmitted to the knowledge database and the other elements may be fixed or constant, or may vary depending on the query represented by the text data.

In such cases, the rate data may be indicative of a rate of receipt of failed queries (for which the knowledge database does not include a satisfactory answer) by the knowledge database. A query may be considered to be received by the knowledge database when the text data is initially received at an input/output component of the knowledge database or when the text data is stored in storage accessible to the knowledge database, which may be temporary storage of the knowledge database such as a buffer or a cache, or primary storage of the knowledge database for storing data indefinitely. This may be indicated by a timestamp indicative of a time of receipt of the text data by the knowledge database. For example, the method may include receiving timestamp data associated with a query of the number of queries, which are for example failed queries, the timestamp data indicating a time at which the query was received by the knowledge database. In some cases, there may be a plurality of timestamps, each representing a time at which the text data was received by a respective component associated with the knowledge database. In other examples, this plurality of timestamps may also represent times at which the text data is received by other components of a system such as that illustrated in FIG. 2, such as components of the speech processing system 120. In cases such as this, any of these timestamps may be taken as representing the time the text data is received by the knowledge database, and used for generating the rate data.

In other examples, text data representing queries transmitted to the knowledge database may be transmitted, transferred or streamed to a trend detection system without introducing a significant or appreciable time delay. In such cases, the failure rate may be considered to represent or correspond to the rate of receipt of the text data at the trend detection system (for queries for which the knowledge database fails or has failed to return a satisfactory answer). The rate data in these examples may therefore be generated based on the rate of receiving the text data at the trend detection system, which may be considered to correspond to the rate of receiving the text data at the knowledge database.

In examples, the text data may correspond to an aggregation or combination of failed queries. For example, data representative of failed queries that were received by the knowledge database within the period of time may be aggregated before being sent to the trend detection system as the text data. In these examples, the method may include receiving a data structure corresponding to the period of time. The data structure may include identifier data for identifying at least one query of the number of queries. In such cases, the rate data may be generated based on the data structure. For example, the data structure may be in the form of a table or list, which may include a series of entries. Each entry may correspond to a failed query received within the respective time period. In these cases, text data elements associated with respective failed queries in the table may correspond with the identifier data, as the text data elements themselves may allow the respective failed query to be identified. Alternatively, though, the identifier data may include metadata representative of the respective failed query. In examples, the data structure may be in the form of a one-way hash map, which includes an identifier representative of a failed query or an identifier representative of a group of failed queries related to the subject (which may be a string) and the number of failed queries related to the subject within the time period. A hash map, which may be referred to as a hash table, is typically a data structure in which a hash function is used to map input values into an array of buckets or slots. The output of a hash function is generally deterministic, in that application of the hash function again to exactly the same input data will produce the same hash. The output is one-way in that the original input data cannot be recovered from the hash alone, even with full knowledge of the hash function. The generated hash may be of a fixed length.

In this context, failed queries may be mapped by the hash function into respective buckets. Each different failed query may be mapped to a separate bucket or a plurality of failed queries (such as failed queries relating to the same or a similar subject) may be mapped to the same bucket. For example, this may allow failed queries to be grouped into buckets according to subject, as described further below.

The time period used for aggregating failed queries may be configurable, for example to maintain or control a rate of receipt of aggregated data at the trend detection system. For example, the time period may be an hour, 10 minutes, 1 minute or other time periods, depending on a throughput or data rate that can be sustained by the network 128.

Referring back to FIG. 4, at item 176, a period of time associated with the number of queries, which are for example failed queries for which no satisfactory answer was received from the knowledge database, is determined. For example, the period of time may be considered to be a time period within which the queries were received by the knowledge database, as will be described further below. The period of time may correspond to a difference between an earliest time at which a query of the queries was received by the knowledge database and a latest time at which a query of the queries was received by the knowledge database. The period of time may be determined based on the timestamp data for example.

At item 178 of FIG. 4, rate data indicative of a failure rate is generated based on the number of queries and the period of time. Various different methods may be used to determine the failure rate, or example depending on a rate condition used to determine whether the subject the queries relate to is trending. This is explained further below. At item 180 of FIG. 4, it is determined that the failure rate satisfies a failure rate condition. The failure rate condition to be satisfied may be selected to capture failed queries that relate to an emerging trend. In this way, failed queries relating to a particular subject may be considered to relate to a trend where the failure rate for these failed queries increases sufficiently quickly or by a sufficiently large amount, for example compared with historical or previous failure rates of failed queries relating to that subject. A subject may be considered to be a trend or a trending subject where there is a general increase in queries related to that subject. For example, there may be a surge or sudden increase in the number of queries related to that subject over a relatively short timescale, such as less than a day, or the increase in the number of queries may occur more gradually or over a longer timescale. These queries may come from users that are geographically spread or in different physical locations or they may be from users that are more concentrated geographically, such as within the same country or within the same region of the same country.

The failure rate for example represents the number of queries related to the subject (which the knowledge database is unable to provide a satisfactory answer for) that are received by the knowledge database within the period of time. For example, the failure rate may correspond to a frequency of receiving the queries at the knowledge database. Alternatively, as explained above, the failure rate may represent the number of failure indications for queries related to the subject that were received from the knowledge database with the period of time.

The failure rate typically varies over time, as the failure rate will generally depend on the behavior of users (such as when users choose to submit their queries), which is liable to change. For example, the failure rate may be higher during the day than at night, when users are typically asleep. The failure rate may not be an exact failure rate (which, as explained above, may change frequently). Instead, the failure rate may be a mean, average or representative rate that captures the general pattern of receipts of the queries sufficiently to be able to determine whether the number of queries relating to the subject is generally increasing and thus whether the subject is a trend.

The failure rate condition is typically any criterion, parameter, value or other constraint that the failure rate may be compared against to determine whether the failure rate is such that the subject of the failed queries may be considered to be a trend. Generally, the failure rate may be compared with the failure rate condition to identify whether the failure rate is sufficiently high or has changed sufficiently rapidly for the subject to be considered a trend that the query-answering system is likely to receive future queries about, at least over a short time period following the receipt of the failed queries upon which the rate data is based. The value of the failure rate condition (for example the value of a threshold against which the failure rate may be compared) may be predetermined, for example based on an expected failure rate, which may be determined using historical data representative of a failure rate for other subjects that have trended previously. The value of the failure rate condition may be fixed or varying. For example, the value of the failure rate condition may alter depending on an instantaneous or current rate of receipt of queries relating to all subjects to increase an efficiency of the query-answering system. For example, where a current rate of receipt of queries is relatively low, the query-answering system may have a greater capacity for transmitting queries to the query-answering component. In such cases, the failure rate condition (such as a threshold for a failure rate to satisfy the failure rate condition) may be loosened, so that it is easier for failed queries to satisfy the failure rate condition, meaning that a larger number of subjects are considered trending than otherwise.

Various different methods or models may be used to determine that the failure rate satisfies the failure rate condition. For example, determining that the failure rate satisfies the failure rate condition may include determining that at least one of: the failure rate over the period of time exceeds a threshold rate, a change in the failure rate over a predetermined period of time comprising the period of time exceeds a threshold rate change, or the number of failed queries other the period of time exceeds a threshold number. In such examples, determinations such as this are also considered to include determining whether the failure rate, change or number meets or exceeds a threshold rate, rate change or number.

For example, the trend detection system may include one or more heuristic models for determining whether the failure rate satisfies the failure rate condition. A heuristic model is for example a model representing the failure rate. The heuristic model may not represent a precise or exact failure rate, as the failure rate may vary over time, but may instead represent a sufficient representation or indication of the failure rate to determine whether the failed queries correspond to a trend. The heuristic model may thus provide an estimate or approximation of the failure rate rather than the precise failure rate itself. The rate data may represent the heuristic model of the failure rate.

In examples, the rate data represents a first heuristic model, which includes data representative of long term statistics such as a long term mean popularity of failed queries related to a particular subject, such as the average failure rate over a relatively long period of time, such as a month. The average failure rate may for example be the mean, median or mode rate. The first heuristic model may also include data representative of short term statistics. Short term statistics such as this may include a short term mean popularity of failed queries related to the particular subject, such as the average failure rate over a relatively short period of time, such as a day, and an acceleration parameter representative of the derivative of the rate, which provides a measure of how rapidly the failure rate is increasing. With the first heuristic model, if the average failure rate over the relatively short period of time exceeds a threshold rate or if the acceleration parameter exceeds a threshold rate change, the failure rate may be considered to satisfy the failure rate condition. For example, the relatively short period of time may correspond to the period of time with which the number of failed queries are associated. The relatively long period of time may correspond to the predetermined period of time comprising the period of time, and may be considered to represent a historical failure rate.

In examples in which the number of queries is a second number of queries (which are for example failed queries), the period of time is a second period of time, the rate data is second rate data and the failure rate is a second failure rate, the method may include determining a first number of queries for which an answer was undetermined from the knowledge database and are related to the same subject as the second number of queries. For example, the first number of queries are queries for which the knowledge database does not include a satisfactory answer. A first period of time associated with the first number of queries may be determined (for example by calculating a difference in time between an earliest of the first number of queries and a latest of the first number of queries). The first period of time commences before the second period of time and may or may not include the second period of time. In other words, the first time period may be immediately before the second time period or there may be an intervening time period between the first time period and the second time period. For example, the first period of time may be the relatively long period of time described above and the second period of time may be the relatively short period of time described above. Based on the first number of failed queries, first rate data indicative of a first failure rate may be determined, for example as described above for the determining of the rate data. In examples such as, determining that the failure rate satisfies the failure rate condition may include determining that an increase from the first failure rate to the second failure rate exceeds a threshold increase.

In further examples, the rate data represents a second heuristic model, which includes normalized counts representative of an average rate of receipt of queries related to the particular subject over a predetermined time period, such as 3 to 7 days. For example, the predetermined time period may correspond to the period of time, such that determining the number of queries includes determining the number of queries received within the period of time (which are for example failed queries). The second heuristic model may also include the variance of the average failure rate. A noise associated with the second heuristic model may be modelled using a historical mean failure rate, variance in failure rate and maximum failure rate, which may be based on a failure rate for failed queries related to the particular subject over a period of time that is relatively long compared to the predetermined time period, such as at least twice as long. Based on the second heuristic model, if the average failure rate increases to a failure rate that is larger than an expected failure rate, such as a failure rate which exceeds a historical maximum failure rate, over the period of time, taking into account the variance, it may be considered unlikely that the failed queries are drawn from the same distribution as the historical failed queries. Thus, the failed queries associated with the period of time may be considered to correspond to a trending subject, and the failure rate condition may be considered to be satisfied.

Figure 6:
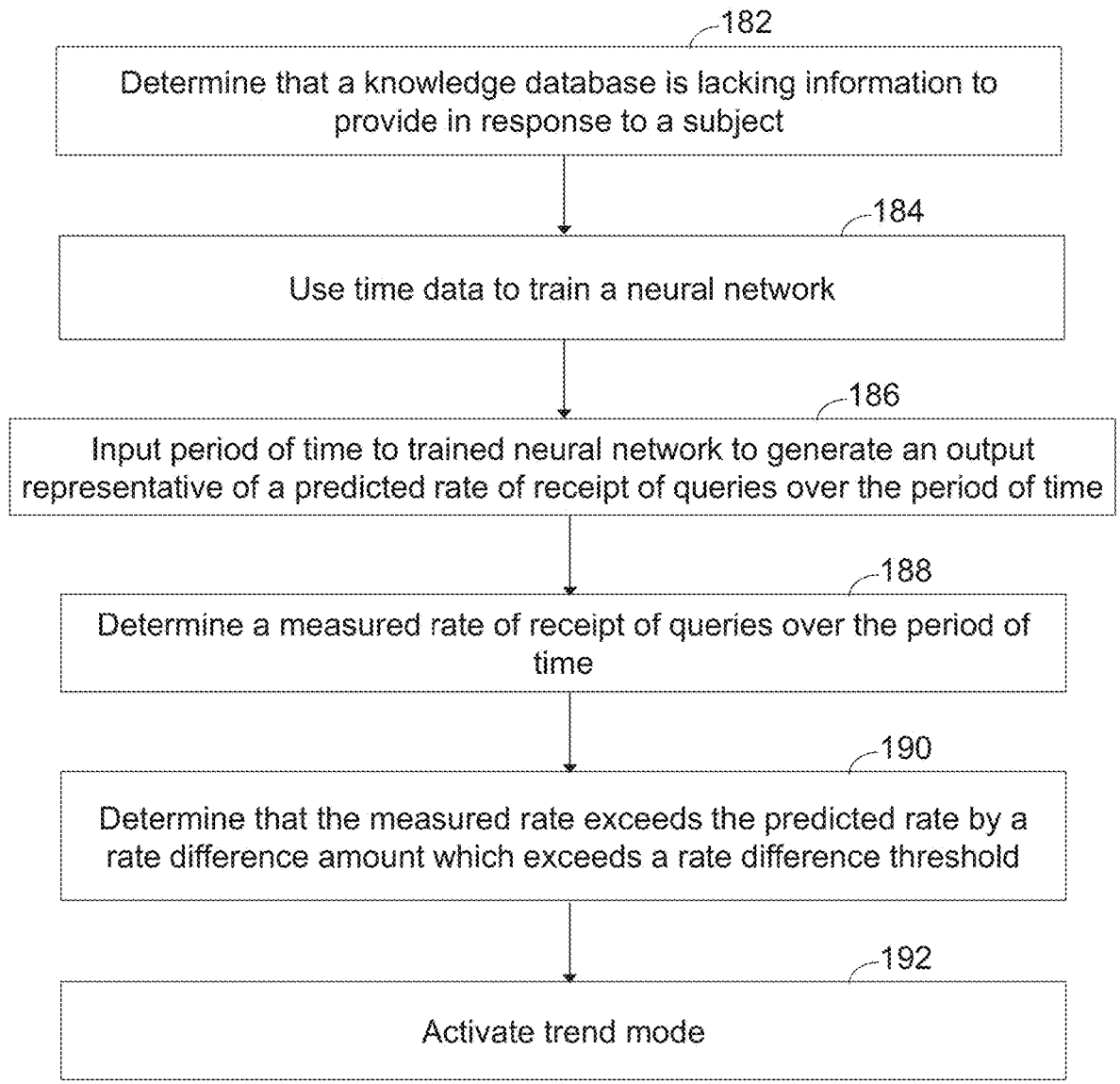
FIG. 6 is a flow diagram showing an example of determining that a failure rate satisfies a failure rate condition.

In yet further examples, the rate data represents a third heuristic model, which for example represents a model of a failure rate, which may be used to obtain a predicted failure rate for the period of time. FIG. 6 shows such an example.

At item 182 of FIG. 6, it is determined, from query data representative of a subject of first queries received by a knowledge database, that the knowledge database is lacking information to provide in response to the subject. The first queries may therefore be considered to be failed queries which all relate to the same subject, such as a trending subject. In this way, it may be identified that the knowledge database is unable to respond satisfactorily to queries relating to this trending subject. The query data is for example text data representative of some or all of the first queries, from which the subject of the first queries may be determined, for example as described further with reference to FIG. 7.

At item 184 of FIG. 6, time data representative of a respective time of receipt of the first queries by the knowledge database is used to train a neural network to model a rate of receipt of the first queries by the knowledge database, to generate a trained neural network. The time data is for example associated with the query data, and may for example represent a time series of data points. For example, a data point may correspond with a query of the first queries and may be associated with a timestamp indicating the time at which the query was received by the knowledge database or at which a failure indication was received from the knowledge database for that query. A time series is typically a sequence of data points that are listed or indexed in time order. For example, the time data may represent a series of timestamps corresponding with respective queries, with sufficient information to be able to order the queries by time.

Any suitable neural network may be used. As the skilled person will appreciate, training of a neural network for example involves passing a plurality of sets of input data (in this case, for example, a plurality of times of receipt of queries of the first queries) through the neural network and adaptively adjusting weights associated with respective nodes of the neural network so that the trained neural network accurately models or maps an input to a given output. For example, in this case, the neural network may be trained to map an input time period to an output predicted rate of receipt of queries by the knowledge database during the input time period.

At item 186 of FIG. 6, a period of time is input to the trained neural network obtained at item 184 to generate an output of the trained neural network which is representative of a predicted rate of receipt of second queries by the knowledge database over the period of time. In examples such as this, the neural network has been trained using the first queries, which each correspond to the same subject. Hence, the trained neural network models the rate of receipt of queries which also relate to that subject; the rate of receiving queries for other subjects may be different, for example depending on current affairs which may influence which topics users are asking queries about. Thus, the second queries in this example also relate to the subject. The period of time for which the rate of receipt of the second queries is predicted is for example subsequent to or after the period of time over which the first queries were received by the knowledge database. For example, the neural network may be trained using historical data (such as the first queries) to predict current or future rates of receipt of queries relating to the same subject as the historical data. The predicted rate of receipt of second queries by the knowledge database may be considered to correspond to a predicted failure rate, as in examples such as this the knowledge database lacks information to provide in response to the subject of the second queries and thus will fail to provide satisfactory answers to these queries.

It is to be appreciated, though, that the method of FIG. 6 is merely an example and other methods may be used to model or predict a rate of receipt of queries relating to a particular subject by a knowledge database. For example, instead of generating a trained neural network, a time series model of a failure rate may be generated, based on the time data and using time series forecasting. Various different methods may be used to obtain a model of the failure rate using time series forecasting. Time series forecasting generally involves the use of a model to predict future values of a parameter (in this example the failure rate) based on previously observed values of that parameter. Such methods typically use time-ordered data, including the values of the parameter at particular points or periods in time. Based on this data (in this example, the time data), future behavior may be extrapolated. For example, time series forecasting may involve using the time data to generate a model of the failure rate which accurately accounts for underlying behavior of users or influences (such as time of day or day of the week). This model may then be used to forecast or predict a future time series of receipt of queries related to the same subject. A predicted failure rate at a future time may then be obtained from the model.

There are a numerous different time series forecasting methods including regression analysis. For example, regression analysis may be applied to failed queries such as the first queries to obtain a model from which a predicted failure rate may be obtained. Many different techniques may be used to perform regression analysis. In general, regression analysis may be considered to be a statistical process for estimating the relationship between variables, such as the variation of the failure rate (or the rate of receipt of queries relating to a particular subject) over time. For example, autoregressive models may be used. Autoregressive models typically specify that the value of a variable depends on previous values of that variable. The moving-average (MA) model, autoregressive-moving-average (ARMA) model and autoregressive-integrated-moving-average (ARIMA) models are examples of autoregressive models, which may be obtained using the query data.

Furthermore, in other examples, alternative machine learning models than neural networks may be trained to model the rate of receipt of queries by the knowledge database.

In general, methods to model the rate of receipt of queries by the knowledge database may capture the failure rate, taking into account features like the day of the week, the week of the month, the month of the year, the hour of the day and the overall rate at which queries are received by the query-answering system, including queries relating to different subjects. In examples such as this, parameters associated with failed queries relating to a particular subject stored as part of model may include a respective weight corresponding to each time series feature of a time series model.

At item 188 of FIG. 6, a measured rate of receipt of the second queries by the knowledge database over the period of time is determined, which may be considered to correspond to a measured failure rate. The measured failure rate may be determined using any of the methods described herein. For example, the measured failure rate may be determined straightforwardly by determining a number of the second queries received by the knowledge database over the period of time and dividing the number of the second queries by a duration of the period of time over which the series of queries were received by the knowledge database.

At item 190 of FIG. 6, it is determined that the measured rate of receipt of the second queries by the knowledge database, which may be referred to as the measured failure rate, exceeds the predicted rate of receipt of the second queries by the knowledge database, which may be referred to as the predicted failure rate, by a rate difference amount which exceeds a rate difference threshold. If the measured failure rate exceeds the predicted failure rate by a relatively large ratio, such as by an amount exceeding the rate difference threshold, the particular subject may be considered to be trending and the failure rate condition may be considered to be satisfied.

At item 192, a trend mode is activated. This for example allows future queries relating to the same subject to be handled differently, as described further below with reference to FIG. 10. For example, text data representative of a query of the second queries may be sent to a query-answering component different from the knowledge database. In some cases, though, item 192 may be omitted and a trend mode may not be activated in response to the determination of item 190.

It is to be appreciated that other, different, heuristic models may be used than those described above. Furthermore, one or more of the first, second and third heuristic models may be combined to determine whether the failure rate exceeds the failure rate condition. Alternatively, an exact or precise value of the failure rate may be used to determine whether the failure rate satisfies the failure rate condition, which may vary over time. In yet further examples, the failure rate may be considered to satisfy the failure rate condition where an absolute number of failed queries related to a particular subject exceeds a threshold number. Above the threshold number, the reduced efficiency of the knowledge database (if, for example, the knowledge database is unable to answer the queries) may cause a sufficiently large degradation in a user experience to justify an alternative approach (such as that described herein with further reference to FIG. 4).

Referring back to FIG. 4, item 198 of FIG. 4 includes sending text data representative of a query of the queries for which an answer was undetermined from the knowledge database to a query-answering component different from the knowledge database. The query-answering component is typically implemented as a separate or different system than the knowledge database. For example, the query-answering component may be implemented using different hardware or software than the knowledge database. The knowledge database and the query-answering component may be implemented in different physical locations or systems, such that the query-answering system comprising the knowledge database and the query-answering component is a distributed system. In other examples, though, the knowledge database and the query-answering component may be located in the same physical location or as part of the same computer device or system. Although the knowledge database and the query-answering component are different, and for example include different data or use different algorithms or methods to answer queries, the knowledge database and the query-answering component may nevertheless be of the same format or structure. For example, the query-answering component may be a further knowledge database that includes different data (such as more data, or data that relates more specifically to the subject of the failed queries) than the knowledge database. In general, the query-answering component may be any computer-based element, implemented in hardware or software or a combination of hardware or software, that differs from the knowledge database and can be used to obtain answers to queries.

The text data may be sent to the query-answering component 198 without further processing. In other examples, though, the text data may be processed before it is sent to the query-answering component 198.

Submission of the text data to the query-answering component may provide a further opportunity to obtain an answer to the failed queries in situations in which the knowledge database has been unable to provide an answer to the failed queries. This may therefore allow the query-answering system to provide an answer to queries that, otherwise, the query-answering system would be unable to answer, improving the effectiveness of the system. In other examples, submission of the text data to the query-answering component may be used to generate instructions to update the knowledge database to improve the effectiveness of the knowledge database at answering future queries related to the same subject.

By transmitting text data to the query-answering component for failed queries that have been determined to satisfy the failure rate condition, the rate of submission of data to the query-answering component may be reduced compared with other examples in which all failed queries are transmitted to the query-answering component. The resources of the query-answering component may therefore be managed more efficiently, by processing solely text data for failed queries related to a trending subject. For example, it may be a waste or unnecessary use of the query-answering component to provide an answer or a knowledge database update for an obscure query that is only asked relatively infrequently, as the impact of being unable to answer an obscure query on users of the query-answering system may be relatively small. Conversely, by focusing the query-answering component on answering failed queries or providing knowledge database updates for a trending subject, these failed queries may be answered more efficiently than otherwise, which may have a more noticeable, and positive, impact on the user experience.

As explained above, the query-answering component may be a further knowledge database similar to the knowledge database described above, but including a larger or greater amount of data, making the query-answering component less efficient to query initially. In other examples, though, the query-answering component may have a different structure than the knowledge database. For example, the query-answering component may include a computer-based system to retrieve data from a wide range of sources, for example sources that are updated frequently to reflect current events. For example, the query-answering component may be configured to retrieve data from news outlets or sources, such as online news publications, or from social media or other information sources that generally include a rapid reaction to developing events or news stories. In other examples, the query-answering component may be an entity or relation extraction system for example for extracting or mining facts from data sources, such as online encyclopedias, online news publications, social media or other information sources. Such systems may be used to extract information in the form of fact triples, which may be added simply to the knowledge database.

In other examples, the query-answering component may include a human analyst. For example, the query-answering component may involve transmitting a notification to the human analyst, via a suitable channel such as a text message, e-mail message or by populating a RSS (Rich Site Summary) feed. The notification may include the query represented by the text data, which may be in the form of a question or query for the analyst to answer, in the form of text.

The analyst may subsequently access an interface, such as graphical user interface (GUI) to view the query represented by the text data. In some cases, the GUI may also display text associated with other failed queries relating to the same subject so that the analyst can view a similarity (or otherwise) between the failed queries. The interface may provide analysts with a tool to interact with the query-answering system, for example allowing the analyst to provide a long-form or narrative answer to the query represented by the text data or to inject a fact answering the query to the knowledge database (as described further below with reference to FIGS. 8 and 9). As will be appreciated, in yet further examples, the role of the analyst may be automated, for example using machine learning.

Figure 7:
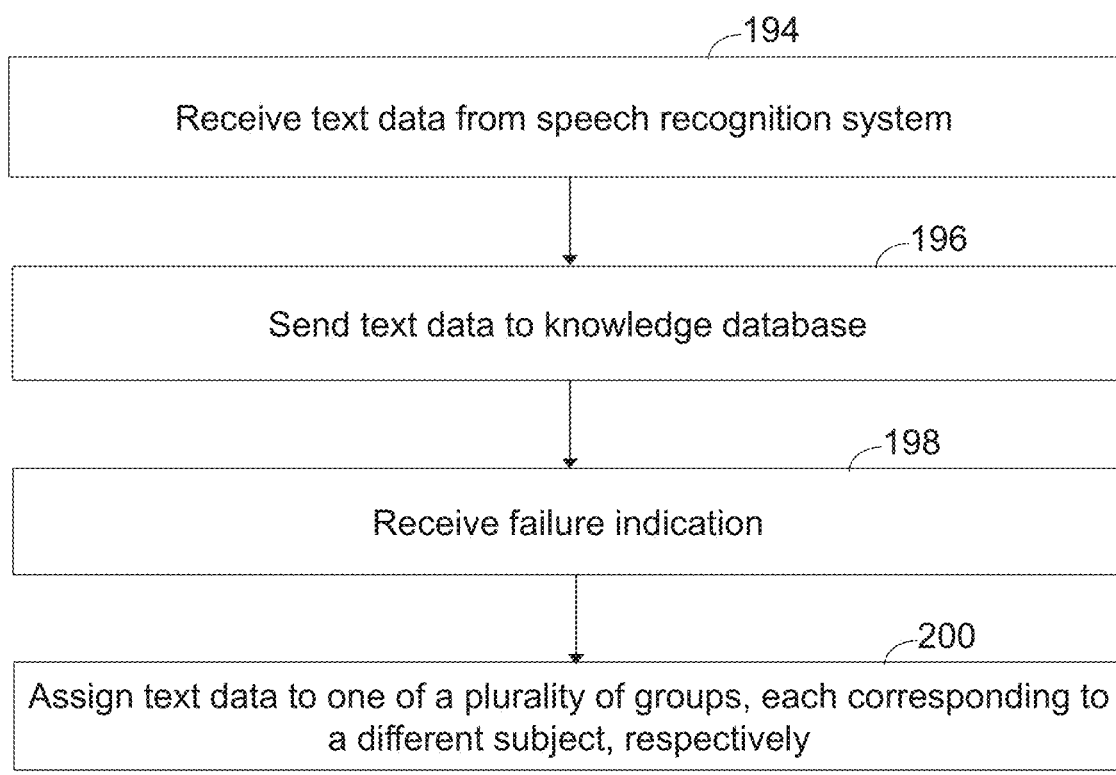
FIG. 7 is a flow diagram showing an example of determining a number of queries related to a subject.

Before describing example responses to the transmission of the text data to the query-answering component in more detail, with reference to FIGS. 8 and 9, FIG. 7 will first be described. FIG. 7 is a flow diagram showing an example of determining a number of queries related to a subject, such as a subject in which a knowledge database is lacking information to provide in response.

At item 194 of FIG. 7, text data is received from a speech recognition system. The text data is converted from audio data representative of an utterance. The text data represents a query asked in the utterance.

At item 196 of FIG. 7, the text data is transmitted to the knowledge database, for example over a network such as the network 128 of FIG. 2.

At item 198 of FIG. 7, a failure indication indicating that the knowledge database has failed to provide a satisfactory answer to the query is received. The failure indication for example indicates at least one of: that an answer to the query was unknown, that an answer to the query was incorrect, or that an answer to the query was not received from the knowledge database within a predetermined time period. In cases in which the answer to the query was incorrect, a determination that the answer was incorrect may be performed by for example transmitting answer text data representative of the answer to the user and asking for the user to confirm that the answer is correct. The user may then indicate whether the answer is correct or not, either orally, for example by speaking to a speech controlled appliance, or by supplying input text in systems which are not configured to receive speech input.

The failure indication may be provided before the failure rate data is generated. A failure indication may be received for each of the queries submitted to the knowledge database, for which the knowledge database is lacking information to provide in response.

At item 200 of FIG. 7, the text data is assigned to one of a plurality of groups, each of the plurality of groups corresponding to a different subject. For example, the query may be one of a first number of queries related to a first subject. The text data in these examples may be first text data which may be assigned to a first group corresponding to the first subject. In such examples, the method may include determining a further number of queries that failed and are related to a second subject, different from the first subject. Second text data associated with the further number of queries may be assigned to a second group corresponding to the second subject. By doing this, failed queries related to the same subject (such as the first number of queries) may be assigned to the same group.

As explained further below, the groups may not be predefined or pre-existing and new groups may therefore arise or emerge over time. For example, queries relating to a subject that does not correspond to an existing group may be assigned to a new group. In other words, new groups may be created as needed, as new subjects arise. This may be the case for a subject that starts to form a trend. At a first point in time, there may be no group for such a subject, for example where the subject is a new subject relating to a current event that has occurred just before the first point in time. However, as queries relating to the new subject are received and processed, these queries may be assigned to a new group corresponding to this new subject, at a second, later, point in time.

Assigning queries to one of a plurality of groups as described above may for example be used to reduce a throughput of data through the query-answering system (for example where text data relating to a particular subject of the queries is aggregated or combined before transfer between components of the query-answering system, such as to the trend detection system). Furthermore, the computational resources for processing of the text data may be reduced by grouping the text data and providing an answer to a representative query of a group of failed queries rather than providing separate answers to each individual query, despite the failed queries relating to the same subject or corresponding to the same question.

Grouping of the queries for example allows the number of individual text data elements (each corresponding to a separate query) to be reduced from a large number, of the order of millions, to a smaller or more manageable number, such as less than 100,000 groups. These groups may be processed more efficiently than processing each text data element individually.

The queries may be grouped in real time, or as the queries are received by the knowledge database or transferred from the knowledge database to the trend detection system. A variety of different grouping or text clustering algorithms may be used to group the queries in this way. For example, at least one of assigning the first text data or assigning the second text data may use at least one of: a text clustering algorithm, locality-sensitive-hashing (LSH), quantized word embedding or a trained classifier.

LSH typically includes generating a lossy signature based on the n-grams in text. LSH therefore allows the dimensionality of high-dimensional data to be reduced, so that similar text data maps to the same group with a high probability. Each group may correspond with what may be referred to as a bucket, where the number of buckets is much lower than the number of different text data elements that may be input to the LSH function.

Quantized word embedding for example averages word embeddings for words represented by text data, then discretizes a continuous vector to get a cluster-identifier. As the skilled person will appreciate, a word embedding for example corresponds to a feature vector representation of a word. By performing the word embedding, the word may be mapped to a feature vector of real numbers within a continuous vector space. Text data assigned to the same cluster-identifier using quantized word embedding may be considered to correspond to the same group.

A granularity of the plurality of groups may be controlled for example depending on a maximum throughput of the query-answering system (as typically increasing the granularity increases the number of groups, increasing the throughput). For example, by increasing the number of groups, the number of queries to be processed by the query-answering system is typically increased. However, the number of utterances processed through the system as a whole will remain the same (these utterances will just be divided into a larger number of different groups than previously). With LSH, the group granularity may be controlled by modifying the minimum hash parameter, which for example represents the number of bits of the hash that are used for representing the groups, and/or the number of hash functions. Similarly, with quantized word embedding, the group granularity may be controlled by modifying the quantization granularity, for example by modifying the extent of discretization of the continuous vector into clusters or groups. Both the LSH and quantized word embedding techniques for grouping queries may be used to detect new groups as they emerge, for example based on queries related to a newly-emerging subject, rather than having to alter or adjust the grouping algorithm based on pre-identifying that a new subject is emerging. In this way, these techniques can be used to increase the number of groups as new subjects arise, for example based on current affairs or world events. Thus, techniques such as this implicitly cluster or group queries into groups rather than other techniques (which may be used in other examples), which cluster queries into predefined groups, and which may be slower and may not account for new subjects without modification.

In other examples, a classifier may be trained to generate a semantic hash code, such that processing similar words using the trained classifier produces the same output hash code with a high probability.

In examples involving grouping of queries according to subject, queries may be grouped such that each subject relates to a particular question. In other words, the subject may itself be a question. As a concrete example, queries corresponding to the questions "Where is weather event X right now?" and "What strength is weather event X right now?" may be considered to relate to different subjects as, despite both relating to weather event X, they each relate to a different aspect related to weather event X.

Once groups of queries have been identified, grouped text data (for example representative of the queries) may be transferred to the query-answering component. In examples, the text data elements corresponding to a particular subject may be considered not to be mutually exclusive, so that different granularities of processing may be performed if needed. The grouped text data may be transferred as part of a data structure that for example includes a group identifier and, for each group, text data representative of a query of the group. The text data may therefore represent an example of a query belonging to that group.

Figure 8:
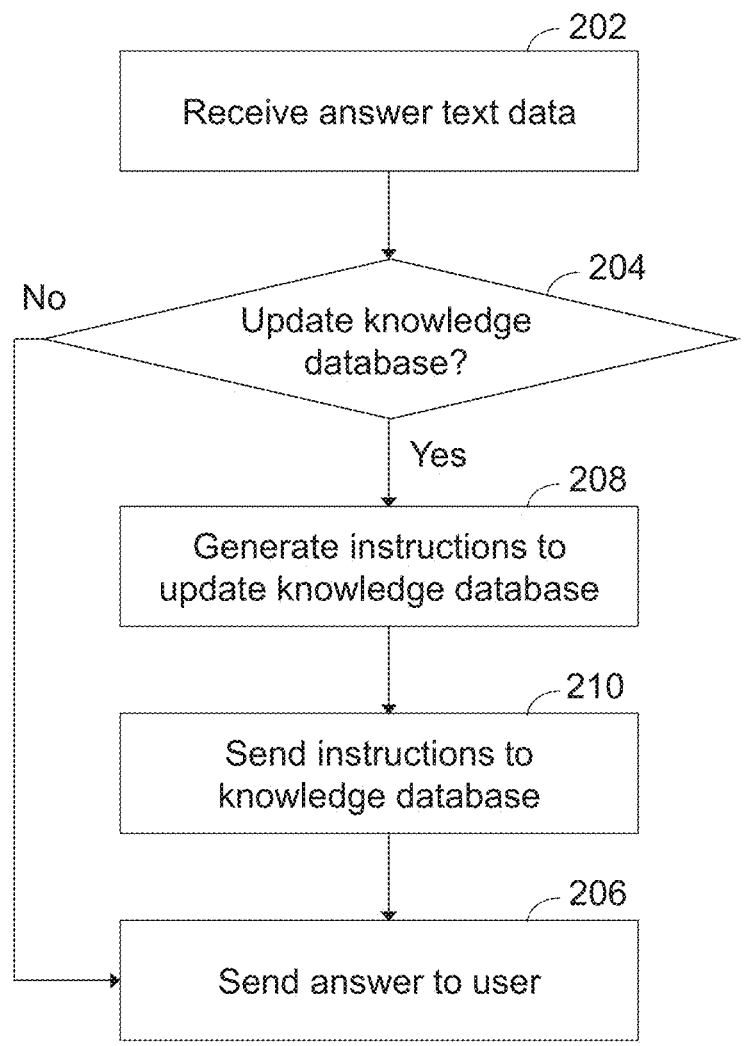
FIG. 8 is a flow diagram showing an example response to transmitting text data to a query-answering component.

FIG. 8 is a flow diagram showing an example response to transmitting the text data to the query-answering component, which is for example performed in response to a knowledge database of a query-answering system including the query-answering component not including a satisfactory answer to the query represented by the text data.

At item 202 of FIG. 8, answer text data is received from the query-answering component. The answer text data may be received directly from the query-answering component, without being transferred via one or more intermediary components or systems. Alternatively, the answer text data may be received indirectly from the query-answering component, via at least one further system or component. The answer text data is representative of at least part of an answer to the query represented by the text data.

At item 204 a check is made as to whether the knowledge database is to be updated. This check may be absent in some cases, though, for example if the query-answering system is configured to automatically attempt to update the knowledge database or, conversely, if the query-answering system is configured not to update the knowledge database in response to receipt of the answer text data.

If the knowledge database is not to be updated, an answer is sent to the user at item 206. The answer may also be sent to the user at item 206 after the knowledge database has been updated. For example, the knowledge database may be updated to include the answer and the answer may subsequently be retrieved from the updated knowledge database. The answer may be sent to the user in the form of answer text data, for example if the methods described herein are used as part of a text-based system. In such systems, the user may transmit queries as text, for example by inputting queries to a computer device, and receive responses to the queries as text. Alternatively, further processing may be performed on the answer text data to generate the data that is transmitted to the user. For example, with the system illustrated in FIG. 2, the answer text data may be processed using a speech synthesizer, such as the TTS system 160 of FIG. 3, to generate output audio data representative of the answer to the query. The output audio data may then be transferred to the user, for example as output audio which may be played by a speaker of the speech-controlled appliance 122.

If the knowledge database is to be updated, however, the method of FIG. 8 involves generating instructions to cause an update of the knowledge database based on the answer text data, at item 208. At item 210, the instructions are transmitted to the knowledge database. The knowledge database can then be updated appropriately, for example by adding a new node to the knowledge database, with the new node associated with an answer to the query (for example as represented by the answer text data). The new node may be linked to at least one other pre-existing node of the knowledge database by at least one new edge, for example to represent associations between the new node and the at least one other pre-existing node. These associations may correspond to an interaction or relationship between the concepts associated, respectively, with the new node and the at least one other pre-existing node.

Figure 9:
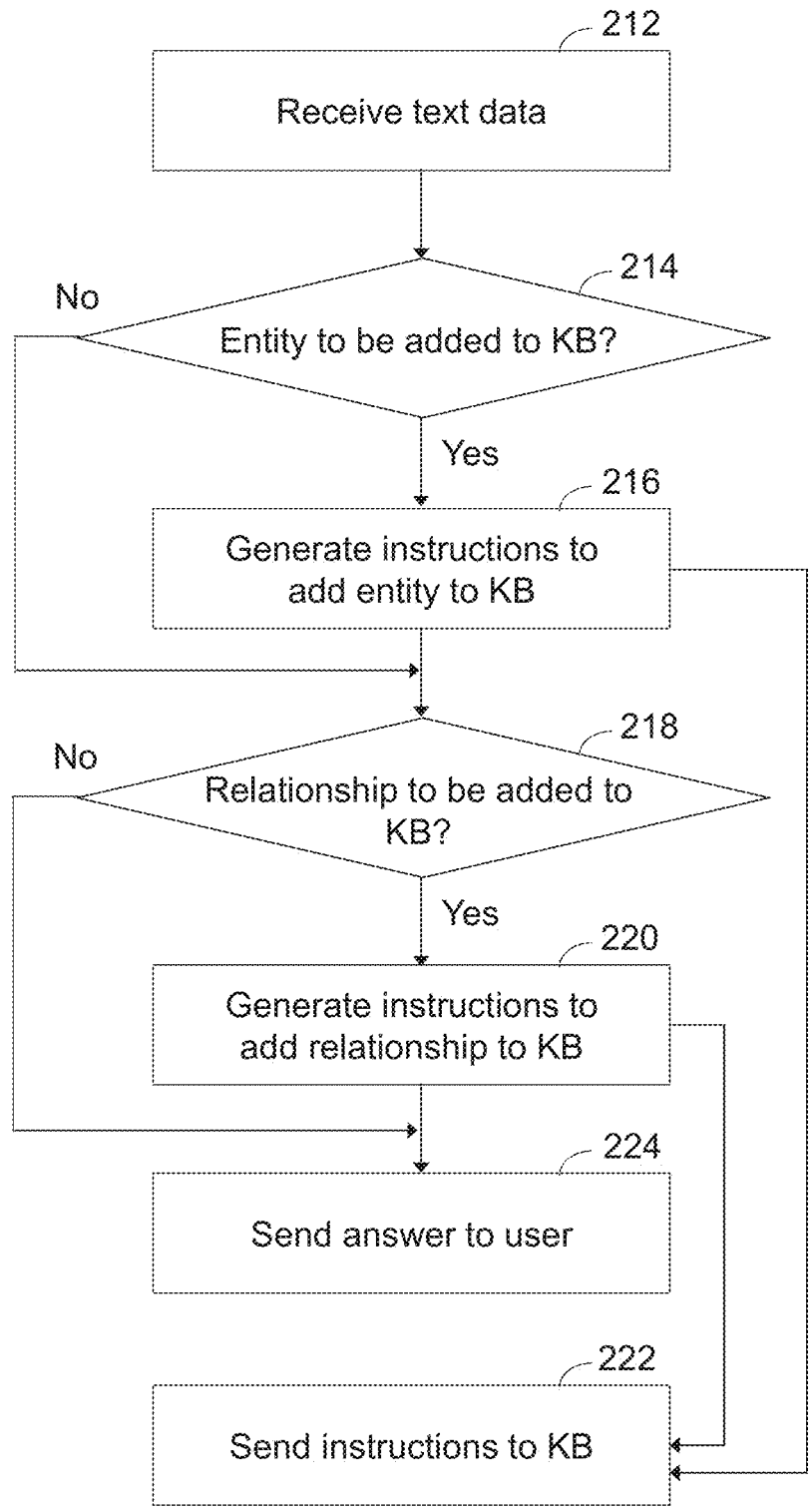
FIG. 9 is a flow diagram showing an example of updating a knowledge database.

FIG. 9 shows in more detail an example of updating the knowledge database. At item 212, text data representative of a query, such as a failed query, is received. For example, the text data may be received by the query-answering component, which may be used to determine an answer to the query represented by the text data. The query-answering component may thus generate answer text data representative of an answer to the query.

At item 214 of FIG. 9, it is determined whether an entity is to be added to the knowledge database. This determination may be performed for example based on a determination that the knowledge database does not include a node corresponding to an entity forming part of the answer to the query, such as an object or predicate (where the answer may be expressed in the form of a fact triple). At item 216 of FIG. 9, new entity instructions to add the entity to the knowledge database may then be generated if it is determined that the entity is to be added. For example, the entity may be associated with the subject, such as an object or predicate of a query relating to the subject.

Alternatively, where the query-answering component includes a user interface to receive a user input, a portion of the knowledge database, such as a portion including an entity or relationship that is present in the answer, may be displayed via the user interface. The user may then navigate or view the knowledge database to determine how the knowledge database is to be updated to provide a satisfactory answer to the query. The user may then submit an indication, via the interface, to instruct an appropriate update to the knowledge database. For example, the user may determine that an entity is to be added to the knowledge database to answer the query and may enter an appropriate command via the interface to update the knowledge database (item 214 of FIG. 9). A new entity indication may then be received, for example from a computer device associated with the user (which for example displays the interface), indicating that the entity is to be added to the knowledge database. The new entity indication may for example be received by a system such as the system of FIG. 2, for example by the query-answering system 136. The query-answering system 136 may generate new entity instructions to add the entity to the knowledge database (for example as shown in item 216 of FIG. 9) and send the new entity instructions to the knowledge database.

If, at item 214 of FIG. 9, it is determined that no new entity is to be added to the knowledge database, or after the generation of the new entity instructions to add the new entity to the knowledge database, the method of FIG. 9 continues to item 218. At item 218 it is determined whether a relationship between two existing entities of the knowledge database is to be added to the knowledge database. If so, new relationship instructions to add the relationship to the knowledge database are generated at item 220. Items 218 and 220 may be performed similarly to items 214 and 216 respectively, except determining whether a new link or connection between two entities that are already present within the knowledge database is to be added. For example, item 218 may involve receiving, from the query-answering component, a new relationship indication that a relationship between two existing entities of the knowledge database is to be added to the knowledge database.

At item 222 of FIG. 9, instructions to update the knowledge database (which may include the new entity instructions and/or the new relationship instructions) are sent to the knowledge database. The knowledge database may then be updated appropriately, for example to include the new entity and/or the new relationship. For example, in some cases, both a new entity and a new relationship may be added to the knowledge database Finally, at item 224 of FIG. 9, an answer is sent to the user. This may be similar to the sending of the answer to the user in item 206 of FIG. 8.

It is to be appreciated that FIG. 9 merely provides an example of updating a knowledge database. In other examples, the knowledge database may be updated differently. For example, when a new entity is added (for example by adding a new node to a graph representing the knowledge database), a new relationship between the new entity and an existing entity of the knowledge database may also be added. The new relationship may be of the same type as an existing relationship within the knowledge database (such as "is a" or "is employed by") or may be of a new type, representing a new connection that didn't exist previously. In examples, a new relationship may be inferred, for example based on existing relationships of the knowledge database. For example, if there is a relationship in the knowledge database that doctors are human, it may be inferred that a particular instance of a doctor (such as a particular doctor) is also human.

Figure 10:
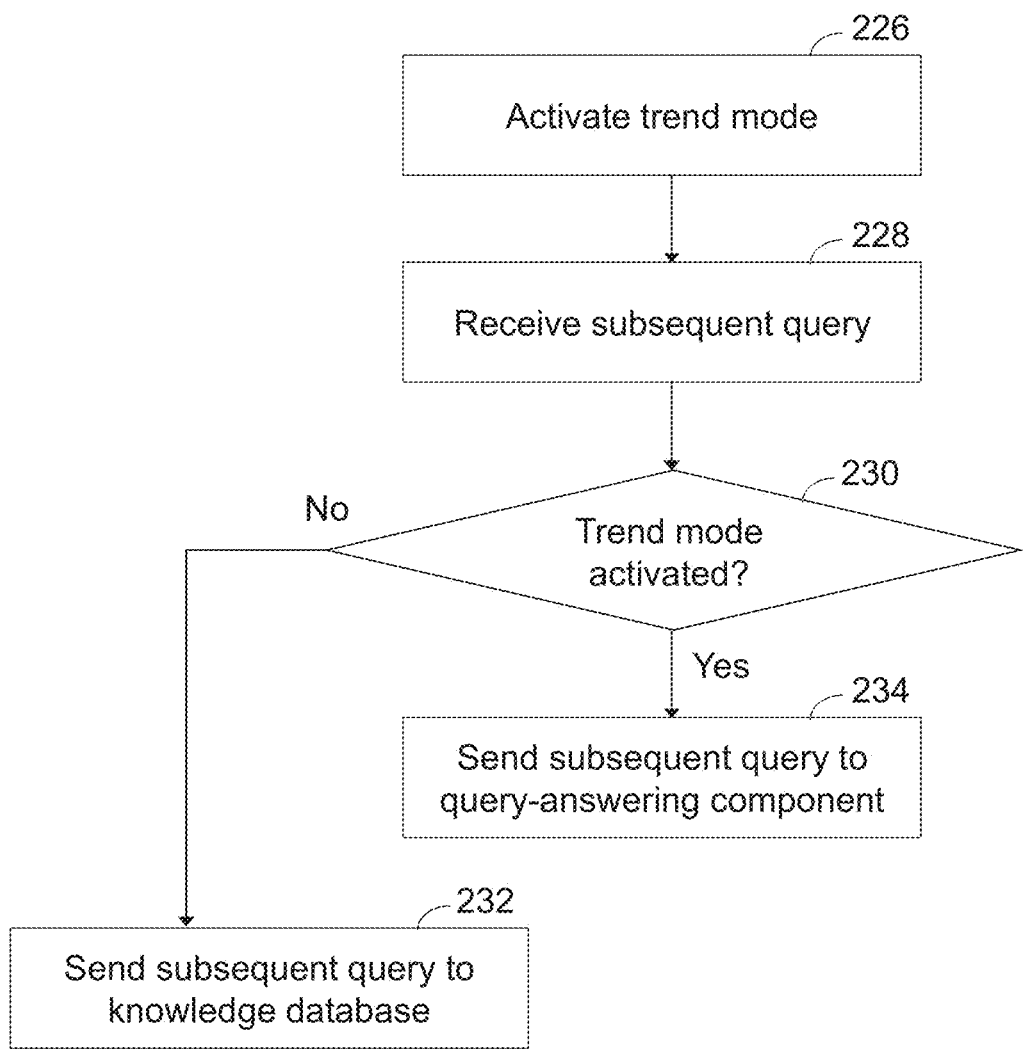
FIG. 10 is a flow diagram showing an example of use of a trend mode.

FIG. 10 is a flow diagram showing an example of use of a trend mode, which may be used as part of methods such as those described herein, for example the methods of FIGS. 4 to 9. The trend mode of FIG. 10 may be activated so that queries relating to a trending subject may be processed more efficiently than otherwise.

At item 226 of FIG. 10, a trend mode is activated. The trend mode may be activated in response to determining that the failure rate satisfies the failure rate condition. The trend mode for example reroutes queries related to the trending subject through a different processing architecture or system than otherwise. For example, the trend mode may allow an existing knowledge database to be overridden for queries relating to the trending subject.

The trend mode may be activated for a particular time period, which may be considered to be an active time period. The time period for which the trend mode is active may depend on the failure rate represented by the rate data. For example, the length of time during which the trend mode is active may increase in proportion to an increase in the failure rate. Alternatively, the time period may be a fixed or constant time period or may depend on a different parameter than the failure rate. After the time period expires, the trend mode may be deactivated, at which point the existing knowledge database may no longer be overridden for queries relating to the trending subject. Alternatively, the trend mode may be deactivated in dependence on the failure rate, for example if the failure rate is less than a particular threshold (such as less than the threshold for determining that the failure rate satisfies the failure rate condition).

At item 228 of FIG. 10, subsequent text data representative of a subsequent query related to the same subject as the number of queries is received. The subsequent query is for example received after receipt of the queries upon which the rate data is based, which are for example failed queries. An identification that the subsequent query relates to the same subject may be performed for example by assigning the subsequent text data to a group, as described above with reference to FIG. 7, and identifying that the subsequent text data has been assigned to the same group as the text data representative of the number of queries.

At item 230 of FIG. 10, it is identified whether the trend mode is activated. This may be performed for example by checking the value of a trend flag, which may take a Boolean or integer value. For example, a value of 0 may indicate that the trend mode is not activated and a value of 1 may indicate that the trend mode is activated (although other values are possible in other examples).

If the trend mode is not activated, the subsequent query is sent, at item 232 of FIG. 10, to the knowledge database.

However, if it is identified the trend mode is activated, the subsequent query is sent, at item 234 of FIG. 10, to the query-answering component without sending the subsequent query to the knowledge database. Thus, based on identifying that the trend mode is activated, the subsequent query may bypass the knowledge database and may instead be transmitted directly to the query-answering component. This may improve the efficiency of the query-answering system, for example by avoiding transmitting the subsequent query to the knowledge database when it is known that the knowledge database may not have an answer to the subsequent query or where it is more efficient to retrieve an answer to the subsequent query from the query-answering component than the knowledge database.

Figure 11:
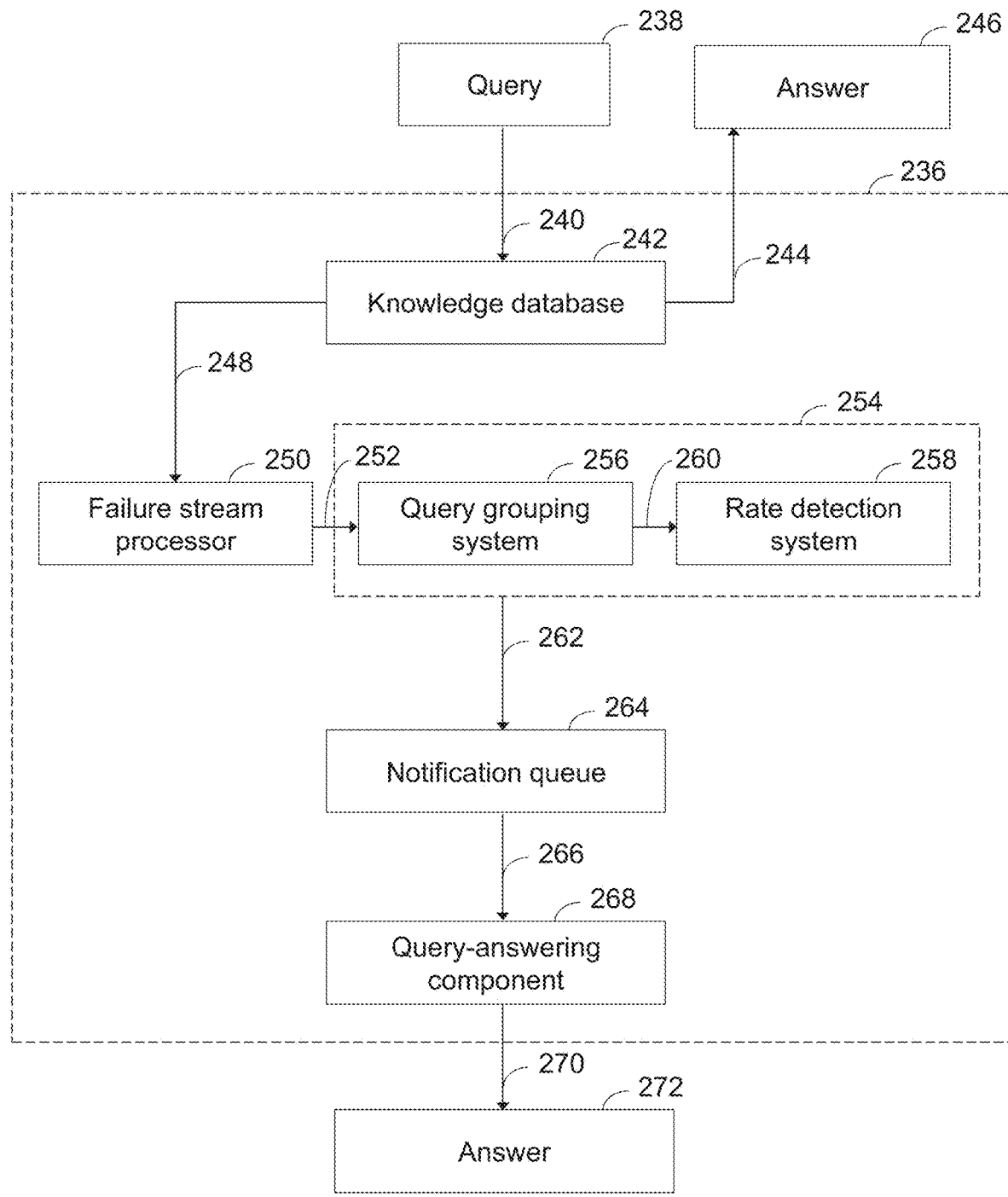
FIG. 11 is a block diagram illustrating schematically components of a query-answering system according to examples.

A block diagram illustrating schematically components of a query-answering system 236 according to examples is shown in FIG. 11. The query-answering system 236 of FIG. 11 may be used in the example methods described herein, although in other examples such methods may implemented using other systems or devices.

Text data representative of a query 238 is received 240 by a knowledge database 242 of the query-answering system 236. If the knowledge database 242 includes a satisfactory answer to the query, the knowledge database 242 returns 244 an answer 246 to the query.

If the knowledge database 242 does not include an answer to the query, the text data is transferred 248 to a failure stream processor 250, which handles failures by the knowledge database 242. As will be appreciated, though, in other examples, the query-answering system 236 may not include a failure stream processor 250.

The failure stream processor 250 sends 252 the text data to a trend detection system 254, which in this example includes a query grouping system 256 and a rate detection system 258. The query grouping system 256 for example assigns the text data to a group, as described above. The text data is then sent 260 to the rate detection system 258. The rate detection system 258 may be used to determine whether the failure rate for failed queries corresponding to a particular subject that the knowledge database is unable to answer satisfactorily satisfies the failure rate condition, as described above. In examples, as explained above, rather than sending individual queries to the rate detection system 258, an aggregated set or series of failed queries may instead be sent to the rate detection system 258 to improve the efficiency of the query-answering system 236. In this example, the query itself is used to generate the rate data (by the rate detection system 258), although in other examples the query may not be used and instead the rate data may be based on a previous set of failed queries relating to the subject of the query.

If it is determined that the failure rate condition is satisfied (or if it is determined that that the trend mode is activated), the text data is sent 262 to a notification queue 264, which manages a rate of transmission of text data to further components of the query-answering system 236. For example, the notification queue 264 may send a notification to an analyst to alert the analyst to the emergence of a new trend. As will be appreciated, though, in some examples the notification queue 264 may be absent, for example where the query-answering component 268 is entirely computer-based.

The text data is then sent 266 to the query-answering component 268, which in this example is different from the knowledge database 242. The query-answering component 268 outputs 270 an answer 272 to the user, for example via the speech controlled appliance 122. The query-answering component 168 may also or instead cause an update of the knowledge database 242 to improve an answer to the query, as described above with reference to FIGS. 8 and 9.

The examples herein are to be understood as illustrative examples. Further examples are envisaged.

Some examples described herein describe the use of the query-answering component after the knowledge database has been unable to answer queries represented by the text data received by the knowledge database. However, it is to be appreciated that in other examples, the methods described herein may be used in other circumstances in which the knowledge database is able to provide a satisfactory answer to such queries but, for example, where the query-answering component is able to provide a satisfactory answer more efficiently or is able to provide a more complete answer. For example, the knowledge database may only be able to provide relatively short answers. However, the query-answering component may be able to provide more lengthy answers, which may be more appropriate for queries that require a narrative answer or that are more nuanced.

In examples described above, subsequent text data representing a subsequent query relating to the same subject as a number of failed queries is sent to the query-answering component rather than the knowledge database if the failure rate satisfies the failure rate condition. The query-answering component may then provide an answer to the subsequent query. However, in other examples, the subsequent text data may be sent to the knowledge database, which may have been updated to include a satisfactory answer to the subsequent query, for example using instructions received from the query-answering component.

In the description above, the labels "first" and "second" are used merely for convenience and do not necessarily suggest that further instances of a particular feature are present.

Further examples are envisaged, which include combinations of features of the originally filed claims, as indicated in the following table, which lists various envisaged claim dependencies for the claims originally filed with this application. Hence, in addition to the description above, this table gives basis in the specification for general examples having a combination of features of claims filed herewith:

| Claim as Originally Filed | Envisaged Claim Dependencies |
| --- | --- |
| 1 | — |
| 2 | 1 |
| 3 | 1, 2 |
| 4 | — |
| 5 | 4 |
| 6 | 4, 5 |
| 7 | Any one of claims 4 to 6 |
| 8 | Any one of claims 4 to 7 |
| 9 | 8 |
| 10 | Any one of claims 4 to 9 |
| 11 | Any one of claims 4 to 10 |
| 12 | Any one of claims 4 to 11 |
| 13 | Any one of claims 4 to 12 |
| 14 | Any one of claims 4 to 13 |
| 15 | Any one of claims 4 to 14 |
| 16 | — |
| 17 | 16 |
| 18 | 16, 17 |
| 19 | Any one of claims 16 to 18 |
| 20 | Any one of claims 16 to 19 |

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method, comprising:
   determining, from query data representative of a first subject of first queries received by a knowledge database, that the knowledge database is lacking information to provide in response to the first subject;
   using time data representative of a respective time of receipt of the first queries by the knowledge database to train a neural network to model a rate of receipt of the first queries by the knowledge database, to generate a trained neural network;
   inputting a period of time to the trained neural network to generate an output of the trained neural network representative of a predicted rate of receipt of second queries by the knowledge database over the period of time, the second queries related to the first subject;
   determining a measured rate of receipt of the second queries by the knowledge database over the period of time;
   determining that the measured rate exceeds the predicted rate by a rate difference amount which exceeds a rate difference threshold;
   in response to the determining that the measured rate exceeds the predicted rate by the rate difference amount which exceeds the rate difference threshold, sending data representative of a query of the second queries to a query-answering component different from the knowledge database;
   assigning first data associated with the second queries to a first group corresponding to the first subject; and
   assigning second data associated with further queries, for which an answer was undetermined from the knowledge database and which are related to a second subject, to a second group corresponding to the second subject.

2. The method of claim 1, comprising:
   at least one of:
   receiving, from the query-answering component, a new entity indication that an entity associated with the first subject is to be added to the knowledge database;
   generating new entity instructions to add the entity to the knowledge database; and
   sending the new entity instructions to the knowledge database; or
   receiving, from the query-answering component, a new relationship indication that a relationship between two existing entities of the knowledge database is to be added to the knowledge database;
   generating new relationship instructions to add the relationship to the knowledge database; and
   sending the new relationship instructions to the knowledge database.

3. A method, comprising:
   determining a number of queries for which an answer was undetermined from a knowledge database and are related to a first subject;
   determining a period of time associated with receipt of the queries by the knowledge database;

generating, based on the number of queries and the period of time, rate data indicative of a failure rate;

determining that the failure rate satisfies a failure rate condition;

in response to the determining that the failure rate satisfies the failure rate condition, sending data representative of a query of the queries to a query-answering component different from the knowledge database;

assigning first data associated with the queries to a first group corresponding to the first subject; and assigning second data associated with further queries, for which an answer was undetermined from the knowledge database and which are related to a second subject, to a second group corresponding to the second subject.

4. The method of claim 3, comprising:

receiving, from the query-answering component, answer data representative of at least part of an answer to the query;

based on the answer data, at least one of:
- determining that an entity associated with the first subject is to be added to the knowledge database;
- generating new entity instructions to add the entity to the knowledge database; and
- sending the new entity instructions to the knowledge database; or
- determining that a relationship between two existing entities of the knowledge database is to be added to the knowledge database;
- generating new relationship instructions to add the relationship to the knowledge database; and
- sending the new relationship instructions to the knowledge database.

5. The method of claim 3, comprising:

activating a trend mode in response to the determining that the failure rate satisfies the failure rate condition;

determining that the trend mode is activated; and sending subsequent data representative of a subsequent query related to the first subject to the query-answering component without sending the subsequent data to the knowledge database.

6. The method of claim 3, wherein the determining the number of queries comprises determining the number of queries for which a response was at least one of: unknown, incorrect, or not received from the knowledge database within a predetermined time period.

7. The method of claim 3, wherein at least one of: the assigning the first data or the assigning the second data uses at least one of: a clustering algorithm, locality sensitive hashing, quantized word embedding or a trained classifier.

8. The method of claim 3, wherein the determining that the failure rate satisfies the failure rate condition comprises determining that at least one of:

the failure rate over the period of time exceeds a threshold rate;

a change in the failure rate over a predetermined period of time comprising the period of time exceeds a threshold rate change; or the number of queries over the period of time exceeds a threshold number.

9. The method of claim 3, wherein the number of queries is a second number of queries, the period of time is a second period of time, the rate data is second rate data, the failure rate is a second failure rate, and the method comprises:

determining a first number of queries for which an answer was undetermined from the knowledge database and are related to the first subject;

determining a first period of time associated with the first number of queries, the first period of time commencing before the second period of time; and generating, based on the first number of queries, first rate data indicative of a first failure rate, wherein the determining that the failure rate satisfies the failure rate condition comprises determining that an increase from the first failure rate to the second failure rate exceeds a threshold increase.

10. The method of claim 3, comprising generating a model of a failure rate for the period of time, wherein the determining that the failure rate satisfies the failure rate condition comprises determining that the failure rate exceeds a predicted failure rate predicted using the model by a rate difference amount which exceeds a rate difference threshold.

11. The method of claim 3, comprising generating the data by performing speech recognition on audio data received from a user device.

12. The method of claim 3, comprising:

receiving a data structure corresponding to the period of time and comprising identifier data for identifying the query, wherein the generating the rate data comprises generating the rate data based on the data structure.

13. The method of claim 3, comprising:

receiving timestamp data associated with the query, the timestamp data indicating a time at which the query was received by the knowledge database; and generating the rate data based on the timestamp data.

14. The method of claim 3, wherein the data is text data.

15. The method of claim 3, comprising:

receiving an answer to the query from the query-answering component; and providing the answer to the query in response to a plurality of queries of the queries.

16. The method of claim 3, comprising:

identifying a representative query representative of the further queries; and sending data representative of the representative query to the query-answering component.

17. A system, comprising:

at least one processor;

at least one memory comprising computer program instructions, the at least one memory and the computer program instructions operable, with the at least one processor, to:

determine a number of queries for which an answer was undetermined from a knowledge database and are related to a first subject;

determine a period of time associated with receipt of the queries by the knowledge database;

generate, based on the number of queries and the period of time, rate data indicative of a failure rate;

determine that the failure rate satisfies a failure rate condition;

in response to the determining that the failure rate satisfies the failure rate condition, send data representative of a query of the queries to a query-answering component different from the knowledge database;

assign first data associated with the queries to a first group corresponding to the first subject; and assign second data associated with further queries, for which an answer was undetermined from the knowledge database and which are related to a second subject, to a second group corresponding to the second subject.

18. The system of claim 17, wherein the at least one memory and the computer program instructions are operable to, with the at least one processor:
receive, from the query-answering component, answer data representative of at least part of an answer to the query;
based on the answer data, at least one of:
  determine that an entity associated with the first subject is to be added to the knowledge database;
  generate new entity instructions to add the entity to the knowledge database; and
  send the new entity instructions to the knowledge database; or
  determine that a relationship between two existing entities of the knowledge database is to be added to the knowledge database;
  generate new relationship instructions to add the relationship to the knowledge database; and
  send the new relationship instructions to the knowledge database.

19. The system of claim 17, wherein the at least one memory and the computer program instructions are operable to, with the at least one processor:
activate a trend mode in response to the determining that the failure rate satisfies the failure rate condition;
identify that the trend mode is activated; and
send subsequent data representative of a subsequent query related to the first subject to the query-answering component without sending the subsequent data to the knowledge database.

20. The system of claim 17, wherein the at least one memory and the computer program instructions are operable to, with the at least one processor:
receive the data from a speech recognition system, the data representing audio data in which a user has asked the query.

* * * * *